United States Patent [19]
Murata et al.

[11] Patent Number: 5,746,857
[45] Date of Patent: May 5, 1998

[54] SEMI-TRANSMISSIVE SEMI-REFLECTIVE FILM LAMINATE AND A METHOD OF PRODUCTION THEREFOR

[75] Inventors: Chikara Murata; Shinichi Takahashi; Mitsuhiro Yoshida, all of Shizuoka, Japan

[73] Assignee: Tomoegawa Paper Co., Ltd., Tokyo, Japan

[21] Appl. No.: 710,882

[22] Filed: Sep. 23, 1996

Related U.S. Application Data

[62] Division of Ser. No. 390,318, Feb. 17, 1995, abandoned.

[30] Foreign Application Priority Data

| Feb. 18, 1994 | [JP] | Japan | 6-021532 |
| Dec. 26, 1994 | [JP] | Japan | 6-323428 |
| Dec. 26, 1994 | [JP] | Japan | 6-323429 |

[51] Int. Cl.⁶ .................... C03C 27/12; G02F 1/1335; B32B 31/12; B29C 41/22
[52] U.S. Cl. .................... 156/102; 156/249; 156/276; 156/289; 264/1.31; 264/1.9; 264/2.7; 264/108; 427/163.4; 427/359; 427/428
[58] Field of Search .................... 264/1.34, 1.35, 264/1.7, 1.31, 1.9, 2.7, 108; 156/249, 276, 99, 289, 102; 427/163.4, 163.1, 359, 428

[56] References Cited

U.S. PATENT DOCUMENTS

| 1,873,951 | 8/1932 | Zocher | 264/1.34 X |
| 2,359,428 | 10/1944 | Land | 264/1.34 |
| 2,398,506 | 4/1946 | Rogers | 264/1.34 X |
| 4,090,773 | 5/1978 | Bauer et al. | 350/1.6 |
| 4,268,127 | 5/1981 | Oshima et al. | 350/337 |
| 4,436,377 | 3/1984 | Miller | 350/345 |

FOREIGN PATENT DOCUMENTS

| 0 045 104 | 2/1982 | European Pat. Off. . |
| 55-106485 | 8/1980 | Japan . |

OTHER PUBLICATIONS

Patent Abstracts of Japan, vol. 10, No. 124 (P–454), May 9, 1986, JP–60–250304, Dec. 11, 1985.

Patent Abstracts of Japan, vol. 11, No. 112 (P–565), Apr. 9, 1987, JP–61–260202, Nov. 18, 1986.

*Primary Examiner*—Francis J. Lorin
*Attorney, Agent, or Firm*—Oblon, Spivak, McClelland, Maier & Neustadt, P.C.

[57] ABSTRACT

A semi-transmissive semi-reflective film laminate consisting of a semi-transmissive semi-reflective layer and a film, the semi-transmissive semi-reflective layer being set on the film, characterized in that the semi-transmissive semi-reflective layer contains pearl pigment and a light transmissive resin, the average of the angles of orientation of the pearl pigments being less than 30°, the film is a film selected from the group consisting of a support body having a vacant space internally and a polarizing film.

15 Claims, 8 Drawing Sheets

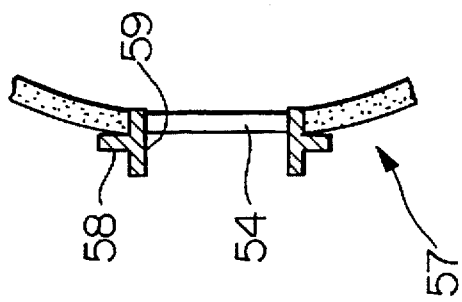
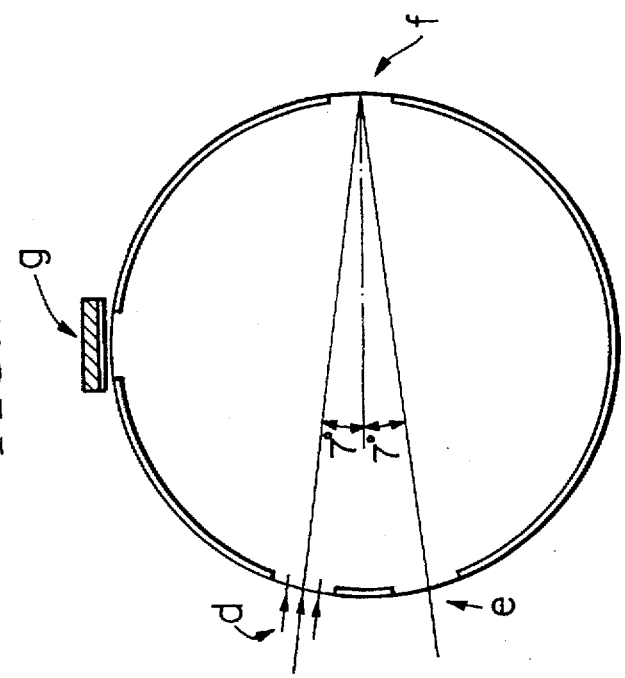

5,746,857

SEMI-TRANSMISSIVE SEMI-REFLECTIVE FILM LAMINATE AND A METHOD OF PRODUCTION THEREFOR

This application is a Division of application Ser. No. 08/390,318, filed on Feb. 17, 1995, now abandoned.

BACKGROUND OF THE INVENTION

1. Field of the Invention

The present invention relates to a semi-transmissive semi-reflective film laminate used in the light source part of a liquid crystal display device. More particularly, the present invention relates to a semi-transmissive semi-reflective film laminate which is suitably used to improve the contrast of the display, and to a production method therefor.

2. Description of the Related Art

Because such devices can be made lighter, smaller and less energy costly, liquid crystal displays have gained attention as displays for use in all fields in the information age. Since liquid crystals themselves do not emit light, it is necessary to effectively employ outside light or an internal light source. Digital watches are one example of the former. A reflective layer is provided to the back of the back plate of a liquid crystal cell, and outside light is reflected by means of this reflective layer. It thus becomes possible to obtain good image contrast. Liquid crystal televisions or computer notebooks are available as examples of the latter. In this case, an internal light source such as a miniature lamp is provided to the back portion of the liquid crystal cell. The light from this internal light source is transmitted to the liquid crystal cell, thereby obtaining good image contrast.

Currently, liquid crystal display devices which have the optical characteristics of both of these examples are being manufactured. A liquid crystal display device such as this employs a semi-transmissive film such as frosted glass or metal thin film which transmits light. Semi-transmissive films such as these are positioned between the liquid crystal cell and the back light. During daylight hours, outside light is reflected, while at night light from the internal light source is transmitted. In this way, it becomes possible to realize good image contrast regardless of lighting conditions.

It is, however, extremely difficult to produce a semi-transmissive film which is compatible with both reflecting outside light and transmitting light from the internal light source of the liquid crystal display device. This is because, in general, films which have good reflective character have poor transmissive character, while films which have good transmissive character have poor reflective character. More concretely, in the case of the former—a film having good reflective character but poor transmissive character—the image contrast of the liquid crystal cell becomes poor when a back light is used at night. In the case of the latter—a film having good transmissive character but poor reflective character—image contrast of the liquid crystal cell becomes poor when outside light is used during daylight hours.

For this reason, there has been a desire for a semi-transmissive semi-reflective film laminate which would make it possible to provide a liquid crystal display device which could suitably and with surety carry out reflection and transmission, and with which it would be possible to obtain good image contrast at any time of the day.

The invention disclosed in Japanese patent application 55-103583 was developed to meet the desire for a semi-transmissive semi-reflective film laminate as described above. This document discloses a reflective-transmissive structure wherein the light reflective layers and the light transmissive layers are alternatively disposed. A polarizing film is laminated onto the reflective-transmissive body. However, this reflective-transmissive body must have irregularities formed in the surface of the transmissive body. Moreover, a metallic reflective pattern must be provided to the irregular surface. The production of a semi-transmissive semi-reflective layer having a structure such as this demands precision, and, additionally, is disadvantageous because of the trouble the procedure requires.

SUMMARY OF THE INVENTION

The present invention was conceived after consideration of the aforementioned problems, and has as its object the provision of a semi-transmissive semi-reflective layer with which the suitable reflection of outside light and the suitable transmission of light from an internal back light can be made compatible, for which production is easy, and, in particular, which is suitable for obtaining a liquid crystal display device which has excellent image contrast. It is also an objective of the present invention to provide a semi-transmissive semi-reflective film laminate and a production method therefor.

According to a first aspect of the present invention, the present invention provides a semi-transmissive semi-reflective film laminate consisting of a semi-transmissive semi-reflective layer and a film, the semi-transmissive semi-reflective layer being set on the film, characterized in that the semi-transmissive semi-reflective layer contains pearl pigment and a light transmissive resin, the average of the angles of orientation of the pearl pigments being less than 30°, the film is a film selected from the group consisting of a support body having a vacant space internally and a polarizing film.

According to a second aspect of the present invention, the present invention provides for a production method for a semi-transmissive semi-reflective film laminate consisting of a polarizing film and a semi-transmissive semi-reflective layer, the method comprising the steps of:

A1: forming a coated layer by coating and adhering the coating solution for the semi-transmissive semi-reflective layer which contains a light transmissive resin and pearl pigment to a polarizing film;

B1: adjusting the coated layer by bringing the coated layer into contact with a tool for adjusting layer thickness; and C1: drying the applied layer after adjusting its thickness; being characterized in that the angle of orientation of the pearl pigments is made 30° or less by means of providing shearing stress to the coated layer in at least one of steps A1 and B1.

BRIEF DESCRIPTION OF THE DRAWINGS

FIG. 7A is a schematic view provided to explain the integrating sphere used in the measuring method B of the measuring manner of JIS K 7105.

FIG. 7B is a schematic view provided to explain the test piece holder inserting into the test piece.

DESCRIPTION OF THE PREFERRED EMBODIMENTS

A detailed explanation will now be made of the semi-transmissive semi-reflective film laminate of the present invention, and the production method therefor.

Figure 1:
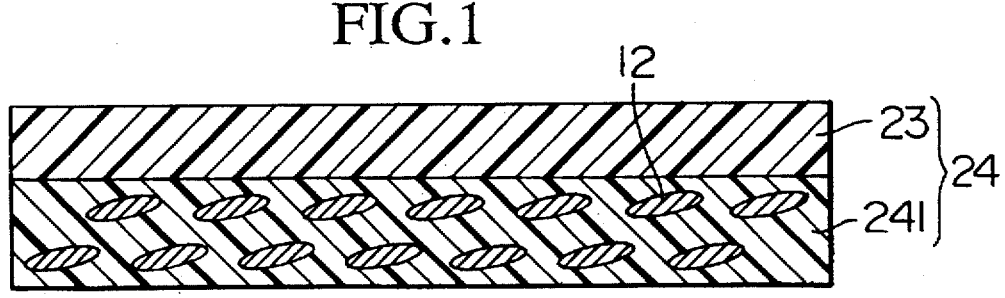
FIG. 1 is a cross-sectional diagram showing a schematic of the semi-transmissive semi-reflective film laminate of the present invention consisting of-a semi-transmissive semi-reflective layer and a polarizing film.

FIG. 1 shows a cross-section of a semi-transmissive semi-reflective film laminate 24 consisting of a polarizing film 23 and a semi-transmissive semi-reflective layer 241.

Employable as polarizing film 23 is a film of a structure wherein a polyvinyl alcohol film which has absorbed iodine or a dye as a dichromatic element is laminated on to a transparent substrate (such as triacetyl cellulose) which has no optical distortion on either side of a uniaxially drawn polarizer.

More concretely, a polarizing film 23 having a structure wherein an adhesive agent is used to adhere a substrate to both sides of a polarizing base substance which is in the form of a film is preferable. The polarizing base in film form may be obtained by, for example, drawing PVA film in a uniaxial direction until it is 3 to 4 times it original size, and impregnating the drawn PVA film by placing it in a high concentration iodine ion solution.

PVA film obtained in this manner however, is subject to such defects as ripping easily, and having a large contraction rate with respect to changes in humidity.

In order to eliminate these defects, the substrate is adhered to both sides of the polarizing base material. High polymer film, cellulose films, polyester films, or polycarbonate films may be used as the substrate. Particularly preferable is a film wherein the water resistance has been improved through the use of a gelling agent such as boric acid or by carrying out thermoprocessing or formalizing.

The main requirement of semi-transmissive semi-reflective layer 241 is that it have the characteristic of reflecting outside light. More concretely, semi-transmissive semi-reflective layer 241 should reflect the outside light which reaches it with good efficiency. A liquid crystal display having this characteristic can provide good image contrast during daylight hours or in a brightly lit spot.

Semi-transmissive semi-reflective layer 241 contains a light transmissive resin and pearl pigments. In particular, it is preferable that the pearl pigments be uniformly dispersed throughout the light transmissive resin.

It is preferable that a light transmissive resin having excellent light and heat resistance wherein the average value of the transmittance of light rays in the visible light region is 75% or greater be used as the light transmissive resin employed in semi-transmissive semi-reflective layer 241. Examples of such a resin include an organic solvent soluble resin, a water soluble resin, a thermoplastic resin such an emulsion of an organic solvent soluble resin, a thermosetting resin, a UV curing resin, or an electric beam (EB) curing resin.

The following are available as concrete examples of the organic solvent soluble resin mentioned above: olefin resins such as polyethylene, polypropylene, polybutene, or polybutadiene; acrylate resins such as polymethylmethacrylate or ethylene-ethyl acrylate copolymer; styrene resins such as polystyrene, AS resin, BS resin or ABS resin; vinyl resins such as polyvinyl chloride, polyvinylidene chloride, polyvinyl acetate, ethylene vinyl acetate copolymer, polyvinyl butyral, vinylidene chloride-acrylonitrile copolymer, vinyl chloride-vinyl acetate copolymer, vinyl chloride-vinylidene chloride copolymer or propylene-vinyl chloride copolymer; polyamide resins such as nylon 6, nylon 66 and nylon 12; saturated polyester resin; polycarbonate resin; polyacetal resin; polyphenylene oxide resin; polyphenylene sulfide resins; polysulfone resisn; polyurethane resins; fluoro resins such as tetrafluoroethylene resin, trifluoroethylene resin or polyvinylidene fluoride; cellulose resins such as ethylene cellulose, acetyl cellulose, or nitrocellulose; epoxy resin, ionomer resins; or rosin derivatives resin.

Available as the water soluble resin mentioned above are gelatin, glue, hydroxyethyl cellulose, carboxymethyl cellulose, methyl cellulose, carboxymethylhydroxyethyl cellulose, hydroxyethyl starch, gum arabic, saccharose octaacetate, ammonium alginate, sodium alginate, polyvinyl alcohol, polyvinyl butyral, polyvinyl pyrrolidone, polyvinyl amine, polyethylene oxide, polystyrene sulfonate, polyacrylic acid, polyamide, or isobutylene-maleic anhydride copolymer. Moreover, a resin derived from an emulsion of an organic solvent soluble resin may also be used.

Available as the thermosetting resin are the following: the rubbers such as natural rubber, isoprene rubber, styrene-butadiene rubber (SBR), butadiene rubber, acrylonitrile-butadeine rubber, butyl rubber, ethylene propylene rubber, chloroprene, acrylic rubber, chlorosulfonated polyethylene rubber, hydrine rubber, urethane rubber, polysulfide rubber, silicon rubber and fluoro rubber: a mixture of these rubbers; a mixture of an aforementioned rubber and an organic or inorganic compound, unsaturated polyesters, epoxy resin, xylene resin, polyamide-imide resin, silicon resin, polyimide resin, polyurethane resin, olefin resin, allyl resin, melamine resin, furan resin, urea resin, phenol resin, phenol-formaldehyde resin, polyester-amino resin and alkyd resin.

Available as the UV curing resin or the electric beam curing resin are acrylic resins or epoxy resins.

These resins may be used alone, or in mixtures of two or more. Moreover, the resin used to form semi-transmissive semi-reflective layer 241 is not limited to the resins mentioned here.

Pearl pigments 12 which are added to the aforementioned resin are formed by covering the surface of a thin sheet of mica particles with titanium dioxide and may be produced, for example, using the method described in WATANABE RYUJI: SHOKUZAIKYOKAISHI 1977, issue 50 pps 460–464 "SAIKIN NO SHINJUGANRYOU NI TSUITE".

More concretely, production can be accomplished through a step for obtaining scale shaped mica, a step for coating the surfaces of the mica with titanium dioxide hydrate, and a step for crystallizing the titanium dioxide hydrate by calcining it.

In the step for obtaining the scale shaped mica, after obtaining muscovite, wet grinding is performed, with classification following. The production step for the scale shaped mica is the most important aspect of the production step, and the quality and yield of the ultrathin pieces of mica obtained in this step has a large effect on the final product. In the production method for the ultrathin pieces of mica, a dry method and a wet method are available. However, in the present invention, it is preferable to use titanium mica obtained using a wet method because such the surface of such mica has more superior smoothness than the surface of mica obtained using a dry method. Moreover, the reason for using muscovite as the form of mica is because it most closely exhibits colorless transparency, and good cleavaging property.

In the step for coating the surface of the mica with titanium dioxide hydrate, titanyl sulfate is added to the ultrathin pieces of mica after classifying. After obtaining a slurry of the ultrathin pieces of mica, heat hydrolysis. In this step, the important point is the uniform and accurate coating of the surfaces of the mica with the titanium dioxide hydrate.

In the step for crystallizing the carbon monoxide titanium hydrate by calcining it, water submersion, dehydration, drying and calcination were carried out.

In the pearl pigments 12 obtained by the above method, coloring occurs when a difference is generated in the wavelengths of the transmitted light and the reflected light of the visible light rays incidenting on the pearl pigments. This wavelength difference arises due to the particle diameter or thickness of the thin sheet of mica which forms pearl pigments 12 or, alternatively, because of the thickness of the titanium dioxide coated thereon. For this reason, in the present invention, it is preferable to select the above conditions so that both the reflected light and the transmitted light are white light.

With respect to the size of the pearl pigments 12, if the average diameter of the scale shaped surface of the pearl pigments 12 is set to the average particle diameter, it is desirable that the average particle diameter be in the range of 1–200 µm or more preferably in the range of 10–100 µm. When the average particle diameter is less than 1 µm, the reflective character deteriorates because the luster of the pearl decreases. Conversely, when the average particle diameter exceeds 200 µm, forming the coating solution of the semi-transmissive semi-reflective layer and forming the coating layer become difficult. In addition, the image becomes difficult to look at because the glare becomes strong.

Various surface processes are possible for pearl pigments 12. For example, in order to stabilize the dispersion of the pearl pigments in the coating solution or in semi-transmissive semi-reflective layer 241 by improving the affinity of pearl pigments 12 with respect to the resin of semi-transmissive semi-reflective layer 241 and its affinity with the coating solution, the surface of pearl pigments 12 may be coated with an organic material such as epoxy resin or melamine resin, or with an inorganic material such as aluminum.

The average of the angles of orientation of the pearl pigments 12 in semi-transmissive semi-reflective layer 241 must be 30° or less, with 15° being preferable.

Figure 2:
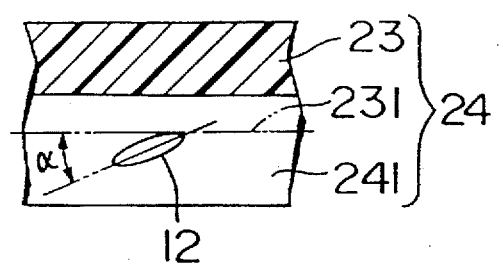
FIG. 2 is a diagram provided to explain the angle of orientation of the pearl pigments which are included in the semi-transmissive semi-reflective layer.

It is noted here that the term "angle of orientation" as used throughout this specification is meant to indicate the average value ($\alpha$) of the angle a between each of the longitudinal axis of 100 optionally selected pearl pigments 12 and a parallel line 231 which is parallel to the planar direction of the polarizing film 23 in an optional cross-section of semi-transmissive semi-reflective film laminate 24. Refer to FIG. 2 for a depiction.

If the angle of orientation of pearl pigments 12 is within the aforementioned limits, incidenting light from the outside strikes each pearl pigment 12 and is reflected with regularity in a fixed direction. For this reason, it is possible to obtain a desirable pearl luster, and realize good image contrast from reflected light. However, when the angle of orientation is larger than 30°, the incidenting light which strikes pearl pigments 12 undergoes a diffuse reflection, causing the pearl luster to be lost. In this case, the image contrast obtained from the reflected light becomes poor.

Further, it is preferable that the pearl pigments 12 in semi-transmissive semi-reflective layer 241 be disposed with a certain space with respect to, in particular, the direction of thickness thereof. "A certain space" is meant to indicate that space between pearl pigments at which light can be transmitted with good efficiency and at which it is possible to obtain good image contrast from the transmitted light. More concretely, obtaining a spacing of 0.1–5 µm is preferable. When the space is less than 0.1 µm, it becomes difficult for the light to be transmitted through the semi-transmissive semi-reflective layer 241. Accordingly, this is not desirable because the image contrast obtained from the transmitted light is poor. Conversely, when the space is wider than 5 µm, little reflection occurs at semi-transmissive semi-reflective layer 241, and the image contrast from the reflected light becomes undesirable poor.

Furthermore, as for the number of pearl pigments 12 in the direction of thickness of semi-transmissive semi-reflective layer 241, it is preferable 2 to 10 pieces. When the number of pearl pigments 12 is less than 2, little reflection occurs at semi-transmissive semi-reflective layer 241. Accordingly, the image contrast from the reflected light becomes poor, and this is therefore undesirable. Conversely, when the number of pearl pigments 12 exceeds 10, it becomes difficult for the light to be transmitted through semi-transmissive semi-reflective layer 241. Accordingly, this is undesirable because the image contrast from the transmitted light is poor.

Further, it is preferable that the thickness of the semi-transmissive semi-reflective layer 241 be in the range of 0.5–100 µm, and more preferably in the range of 2–30 µm. When the thickness is less than 0.5 µm, the image contrast from reflected light becomes difficult to obtain. Conversely, when the thickness exceeds 100 µm, it becomes difficult to sufficiently obtain image contrast from transmitted light.

In order to form such a semi-transmissive semi-reflective layer 241, it is preferable that the weight percentage of solid materials of the pearl pigments 12 and the light transmissive resin (P/B ratio) be in the range of 5/95 to 50/50, and more preferably in the range of 20/80 to 35/65. When the P/B ratio is less than 5/95, it becomes difficult to obtain good image contrast from the reflected light, whereas, when the P/B ratio exceeds 50/50 it becomes difficult to sufficiently obtain good image contrast from the transmitted light.

By controlling the P/B ratio and the thickness, it is possible to adjust the "total light ray transmittance" and the "total light ray reflectance" of semi-transmissive semi-reflective layer 11 in the visible light region.

"Total light ray transmittance" indicates the value arrived at by the calculations described in formula (1) below, while "total light ray reflectance" describes the value arrived at by the calculations described in formula (2) below.

The method of measuring the total light ray reflectance is shown simply below. Namely, a coating film is formed by applying and drying a resin solvent onto a peeling film (manufactured by RINTECH, commercial name 38PF) so as to form a 100 μm thick layer. The coating film is peeled from the peeling film, forming a sample for photometry purposes. Using a spectrophotometer (manufactured by SHIMAZUSEISAKUJO, commercial name MPC-3100), the transmittance and the reflectances for simple light rays, and the transmission and reflectances for diffused light rays were measured for the photometry sample. The average values of the transmittance and reflectances was an average value (integration) in the wavelength range of 380–780 nm.

(1) total light ray transmittance=simple light ray transmittance–diffused light ray transmittance (2) total light ray reflectance=simple light ray reflectance+ diffused light ray reflectance In addition to adding pearl pigments 12 to the light transmissive resin for semi-transmissive semi-reflective layer 241, additives such as a cross-linking agent, a dispersing agent, a leveling agent, or a thickener may also be added.

Resistance to light and heat may be improved by adding crosslinking agents such as isocyanate compounds, amino compounds or epoxy compounds.

Further, in order to improve the transparency of the layer, a high boiling point solvent such as phthalate, phosphate or silicone oil may be added.

Such surface active agents as fatty acid metallic salts or rosined soap may be cited as dispersing agents. By adding a dispersing agent, the dispersion of the pearl pigment is improved.

All types of surface active agents or silicone oil may be cited as examples of leveling agents. By this procedure, unevenness in the outer appearance or thickness of the coated surface, and the dispersion of the pearl pigments can be improved.

Further, in order to improve the dispersion of the pearl pigments, a thickner may be added. Examples of a thicker are cellulose type thickeners are cellulose type thickneres such as nitrocellulose or cellulose acetate propionate.

Semi-transmissive semi-reflective film laminate 24 of the present invention which is formed as described above is obtained by one of the following methods.

The first method comprises the following steps of:

A1: forming a coated layer by coating and adhering a coating solution for a semi-transmissive semi-reflective layer containing a light transmissive resin and pearl pigments to a polarizing film;

B1: adjusting the coated layer by bringing the coated layer into contact with a tool for adjusting layer thickness; and C1: drying the coated layer after adjusting its thickness; the method being characterized in that the average of the angle of orientation of the pearl pigments is set to be 30° or less by means of providing shearing stress to the coated layer in at least one of steps A1 and B1.

The second method of production for a semi-transmissive semi-reflective film laminate comprises the following steps of:

A2: forming a coated layer on a roller by supplying a coating solution for a semi-transmissive semi-reflective layer containing a light transmissive resin and pearl pigments to a rotating roller;

B2: adjusting the coated layer by bringing the coated layer on the roller into contact with a tool for adjusting layer thickness;

C2: transferring the coated layer after adjusting the thickness of the applied layer to a polarizing film and coating and adhering it; and D2: drying the coated layer on the polarizing film; the method being characterized in that the average of the angle of orientation of the pearl pigments is set to be 30° or less by means of providing shearing stress to the coated layer in at least one of steps A2, B2 and C2.

The third method of production for a semi-transmissive semi-reflective film laminate comprises the following steps of:

A3: forming a coated layer by coating and adhering a coating solution for a semi-transmissive semi-reflective layer containing a light transmissive resin and pearl pigments to a transfer sheet;

B3: adjusting the coated layer by bringing the coated layer into contact with a tool for adjusting layer thickness;

C3: drying the coated layer after adjusting the thickness of the applied layer; and D3: laminating the dried semi-transmissive semi-reflective layer which is on the transfer sheet to the polarizing film;

the method being characterized in that the average of the angle of orientation of the pearl pigments is set to be 30° or less by means of providing shearing stress to the coated layer in at least one of steps A3 and B3.

The fourth method of production for a semi-transmissive semi-reflective film laminate comprises the following steps of:

A4: obtaining a coated layer by supplying a coating solution for a semi-transmissive semi-reflective layer containing a light transmissive resin and pearl pigments to a rotating roller;

B4: adjusting the coated layer by bringing it into contact with a tool for adjusting layer thickness;

C4: transferring the coated layer after adjusting the thickness of the applied layer to a transfer sheet, and coating and adhering it;

D4: forming a semi-transmissive semi-reflective layer by drying the coated layer on the transfer sheet; and E4: laminating the dried semi-transmissive semi-reflective layer to a polarizing film;

the method being characterized in that the average of the angle of orientation of the pearl pigments is set to be 30° or less by means of providing shearing stress to the coated layer in at least one of steps A4, B4 and C4.

More concretely, steps A1 and A3 in the first and third methods described above are steps for coating and adhering a coating solution for a semi-transmissive semi-reflective layer in a coating bath using a pick-up roller to a transfer sheet or polarizing film. Steps B1 and B3 are steps for obtaining a fixed layer thickness by bringing the coated layer on the polarizing film or the transfer sheet in the traveling direction thereof into contact with a tool for adjusting layer thickness such as a blade, knife or roller into contact with the , and scraping away the excess coating solution.

In steps A2 and A4 in the second and fourth methods described above, the layer is adjusted to a specified thickness by bringing a tool for adjusting layer thickness such as a blade or knife into contact with the roller, represented, for example, by three or four reverse rolling coaters, and scraping away the excess coating solution from the roller. In steps B2 and B4, the coated layer, the thickness of which has been adjusted, is transferred to polarizing film using an applicator roller or the like.

The laminate in step D3 and E4 of the third and forth methods described above indicates both the case where only the semi-transmissive semi-reflective layer is transferred and laminated, and the case where the entire transfer sheet, that is the transfer sheet and the semi-transmissive semi-reflective layer provided thereon are laminated. Additionally, it is noted here that a variety of methods such as a method wherein lamination is accomplished via thermocompression or an adhesive agent may be employed as the laminating means.

A transfer sheet comprised of a transparent material explained below can be used. In the case of laminating the transfer sheet and the semi-transmissive semi-reflective layer, the transfer sheet can be used as a protective sheet. In the case of laminating only the semi-transmissive semi-reflective layer, it is preferable to use a transparent sheet treated with a releasing agent such as silicone, fluorine, or the like as the transfer sheet.

The coating solution for the semi-transmissive semi-reflective layer employed in production methods one through four can be obtained by a stirring dispersal of the pearl pigments, the light transmissive resin and any other additives as necessary explained above using a stirring apparatus such as a disperser.

It is preferable the value of the viscosity at 20° C. measured with a B type viscometer of the coating solution for the semi-transmissive semi-reflective layer be greater than 100 cps, and more preferably, greater than 500 cps. When using a coating solution for the semi-transmissive semi-reflective layer such as this, it becomes easier to achieve an angle of orientation of the pearl pigments which is below 30° if the shear rate between the layer thickness adjusting tool and the coated layer is in the range of $10^2$–$10^6$ $sec^{-1}$. When the shear rate is less than $10^2$ $sec^{-1}$, it becomes difficult to achieve an angle of orientation which is less than 30°, whereas when the shear rate is greater than $10^6$ $sec^{-1}$ the application speed becomes too fast, making it difficult to obtain a good coated surface.

Additionally, it is noted here that when the layer thickness adjusting tool comes in contact a member which has been provided with the coated layer, for example, a rotating roller or a transfer sheet, the shear speed between the two is preferably in the aforementioned range.

By means of the aforementioned methods one through four, the thickness of the semi-transmissive semi-reflective layer 241 can be easily adjusted by adjusting the viscosity of the coating solution for the semi-transmissive semi-reflective layer, the take-up speed of the polarizing film 23, the contact pressure of the layer thickness adjusting tool or the like.

A preferable production method for a semi-transmissive semi-reflective film laminate was described above. However, in addition to employing a coating solution for the semi-transmissive semi-reflective layer, a method is also possible wherein a film material, formed by mixing and heat melting the composition which forms the semi-transmissive semi-reflective layer, is draw out by extrusion using the technique of extrusion molding or injection molding, and then adhered onto the polarizing film 23 via an adhesive compound or an adhesive bond.

Figure 3:
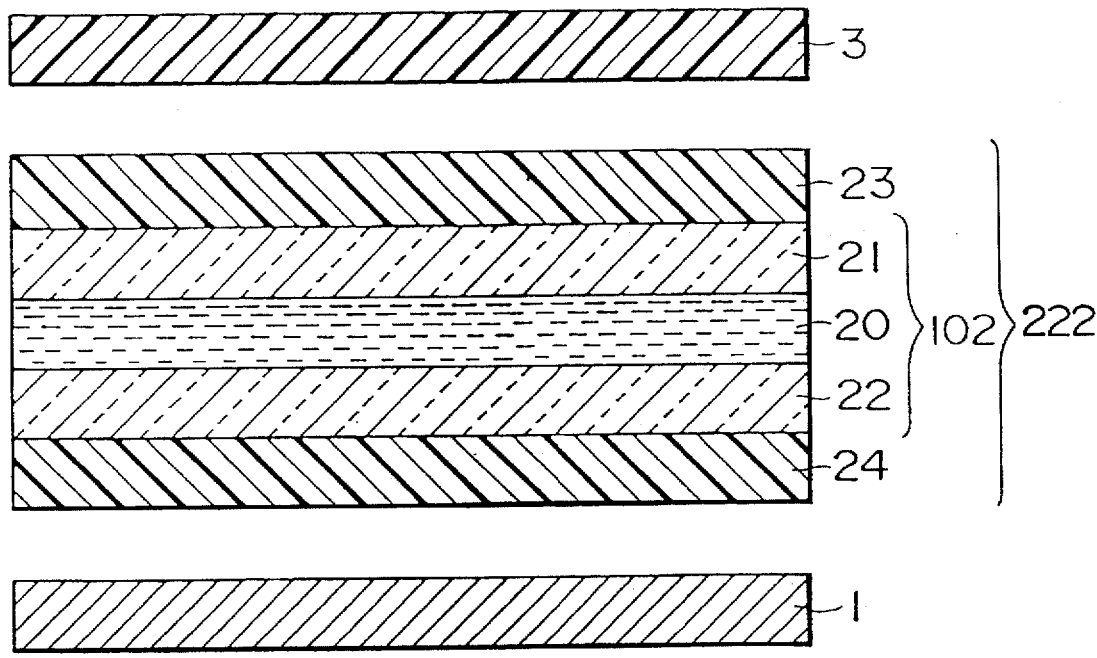
FIG. 3 is a cross-sectional diagram showing the liquid crystal display equipped with the semi-transmissive semi-reflective film laminate shown in FIG. 1.

Using FIG. 3, an explanation will now be made of a liquid crystal display in which the image contrast has been improved by employing a semi-transmissive semi-reflective film laminate 24 of the above construction.

This liquid crystal display panel consists of a liquid crystal panel 222, a back light 1 disposed below liquid crystal panel 222, and a protective glass 3 with a reflection prevention film disposed above liquid crystal panel 2. Liquid crystal panel 222 consists of liquid crystal injected structure 102, polarizing film 23 and semi-transmissive semi-reflective film laminate 24.

Twisted nematic (TN) liquid crystal, for example, may be injected into the liquid crystal injected structure 102.

In forming the liquid crystal injected structure 102, oriented films consisting of polyimide are coated to the surfaces of the transparent electrodes of two glass plates 21, 22 which are provided with these transparent electrodes that consist of a desired pattern. Next, the oriented film is disposed by means of a rubbing operation, and nematic liquid crystal 20 is injected between the plates. This nematic liquid crystal 20 is disposed with a 90° twist because of the operation of the oriented film. Liquid crystal injected structure 102 is then obtained by sealing along the circumference part of glass plates 21, 22.

Liquid crystal panel 222 can be obtained by adhering the semi-transmissive semi-reflective film laminate previously obtained and the polarizing film 23 to the each of the outer sides of the two glass plates 21, 22 of the obtained liquid crystal injected structure 102 so that the polarizing angles are mutually twisted.

The surface of semi-transmissive semi-reflective film laminate 24 which contacts glass plate 21 or glass plate 22 may be the polarizing film 23 side or the semi-transmissive semi-reflective layer 241 side.

However, because the light reflecting characteristics obtained are good, it is preferable to laminate so that the semi-transmissive semi-reflective layer 241 side contacts glass plate 22.

In particular, in order to improve productivity of the liquid crystal display device when providing both glass plate 22 and glass plate 21 so that they contact semi-transmissive semi-reflective layer 241, the semi-transmissive semi-reflective layer 241 and glass plate 21 or glass plate 22 may be adhered together using an adhesive agent or adhesive tape consisting of an acrylic resins, polyester resins, or urethane resins, epoxy resins, phenol resins or vinyl resins to create a unitary structure for use.

A light source 1 is disposed to the semi-transmissive semi-reflective film laminate 24 side of the obtained liquid crystal panel 222. Protective glass 3 with reflection prevention film is disposed to the polarizing film 23 side. In this manner, the liquid crystal display in FIG. 3 is obtained. A leading light plate apparatus (EL), a lamp or the like may be used as the aforementioned light source 1.

When a drive signal is applied to the transparent electrode of the liquid crystal panel 222, an electric field is generated between the electrodes to which signals have been transmitted. At this time, because of the liquid crystal molecules' electronic anisotropy, the long axis of the liquid crystal molecules orients parallel to the direction of the electric field. For this reason, the light's optical activity resulting from the liquid crystal molecules is lost, and a situation results wherein the light is not transmitted. The image display is recognized as visual information through contrast from the difference between the light transmission when the drive signal was transmitted to the transparent electrode and the light transmission when it was not.

A protective layer 242 may be provided on top of semi-transmissive semi-reflective layer 241 of the semi-transmissive semi-reflective film laminate 24 which consists of semi-transmissive semi-reflective layer 241 and polarizing film 23.

Figure 4:
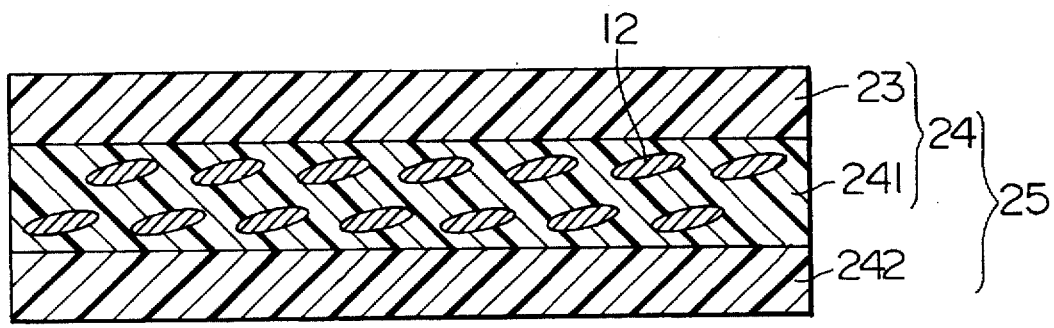
FIG. 4 is a cross-sectional diagram showing a schematic of the semi-transmissive semi-reflective film laminate wherein a protective layer has further been provided to the semi-transmissive semi-reflective film laminate shown in FIG. 1.

Reference numeral 25 has been assigned to indicate a semi-transmissive semi-reflective film laminate provided with a protective layer 242. The structure thereof is shown in FIG. 4.

It is preferable that the transmittance of the protective layer 242 be 40% or greater (measured using a measuring method noted in JIS K 7105).

An explanation now follows of the method of measurement recorded in JIS K 7105, this being the aforementioned method employed to measure the transmittance.

The method of measurement can be segregated into the following two methods depending on the haze value. When the haze value is small (30% or less), measurement is conducted using method A, while when the haze value is large (greater than 30%), measurement is carried out using method B.

Method A will be explained first.

I Measurement Method A
(Measurement Principle)

Figure 5:
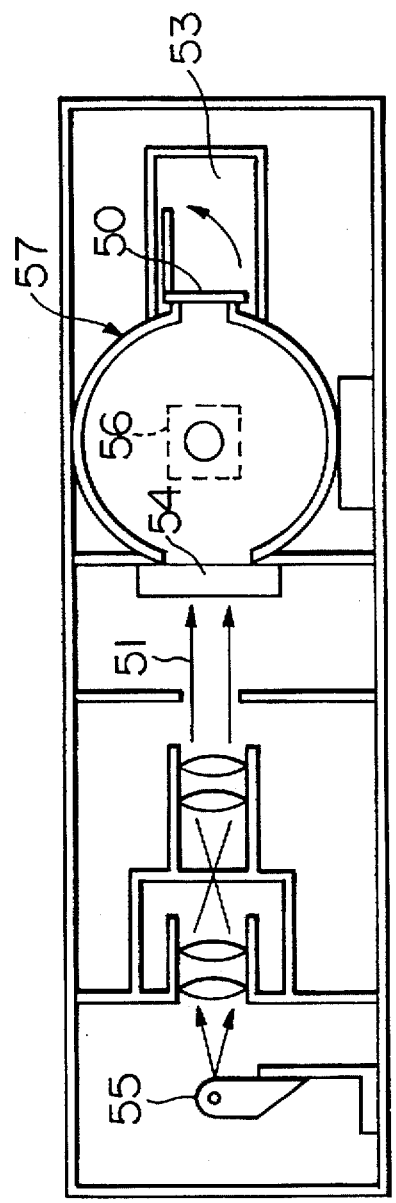
FIG. 5 is a schematic view provided to explain the principle of the measuring manner of JIS K 7105.

The principle of this method of measurement is shown in FIG. 5. A visual sensitive filter can be mounted on the light source side.

(Apparatus Employed)

The apparatus employed must satisfy the following optical conditions.

The standard white plate 50 should have a uniformly high reflectance with respect to the total wavelength of visible light rays. Magnesium oxide, barium sulfate, aluminum oxide or the like are appropriately employed here.

Figure 6:
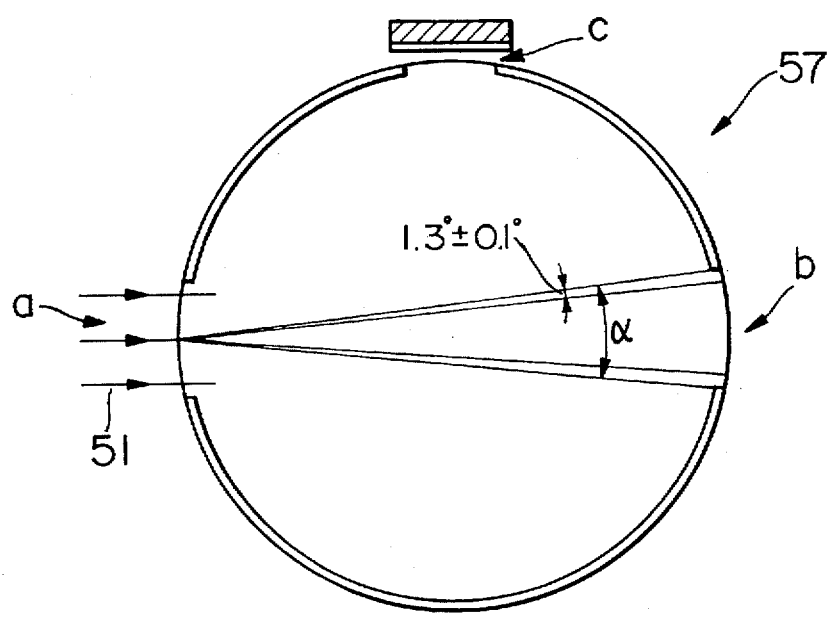
FIG. 6 is a schematic view provided to explain the integrating sphere used in the measuring method A of the measuring manner of JIS K 7105.

The light rays 51 in the beam of light which illuminates the test material are almost entirely parallel, and must deviate no more than 3° from the optical axis. The center of the beam of light coincides with the center of the exit port. The beam of light at the exit port is circular in cross-section, and must be visible. Further, the angle which the diameter of the beam of light forms with respect to the center of the entrance port is 1.3±0.1° smaller than the angle which is formed by the radius of the exit port. The cross-section of the beam of light at the exit port of the integrating sphere is as shown in FIG. 6.

Light trap must absorb light totally, when a test piece 54 or the standard white plate 50 is not attached.

Standard light A is used as the light source 55.

The total sensitivity of the light receiver 56 must satisfy the value of Y in the rooter condition in standard light C using a visual sensitive filter. However, in a case involving a specific designation, measurement may be conducted with a device which satisfies the value of Y in the rooter condition in standard light A.

An integrating sphere 57 is shown in FIG. 6. The sum (a+b+c) of the areas of the light entrance and exit ports (test material and attachment portion for standard white plate) must be less than 4% of the total inner surface of the sphere 57. A center line running between the exit port (b) and the entrance port (a) is on the same large circle of the sphere 57. The angle α which is formed by the diameter of the exit port (b) and the center of the entrance port (a) is within 8°. The inner wall of the sphere is applied with a material having the same reflectance to that of the standard white plate 50.

(Test Piece)

The test piece to be measured has dimensions of 50 mm×50 mm. The thickness is set to the original thickness. Further, three test pieces are employed.

(Measurement Method)

Measurement is carried out as follows using the aforementioned measuring device and test pieces.
(1) The standard white plate is attached, the indicator on the device is set to 100 ($T_1$), and the amount of incident light is adjusted.
(2) With the standard white plate attached, the test piece is attached, and the total amount of light ray transmission ($T_2$) is measure.
(3) The standard white plate and the test piece are removed, the light trap is attached and the amount of scattered light ($T_3$) from the device is measured.
(4) With the light trap attached, the test piece was attached, and the amount of scattered light ($T_4$) from the device and the test piece was measured.

(Method of Calculation)

Next, the obtained measured values are applied to the following formulae.

$$T_t = T_2$$
$$T_d = (T_4 - T_3)(T_2/100)$$
$$T_p = T_t - T_d$$
where,
$T_t$: total light ray transmittance (%)
$T_d$: diffusion transmittance (%)
$T_p$: parallel light transmittance (%)

(Display Method for Results)

The calculated values for the total light ray transmittance, diffusion transmittance, and the parallel light transmittance are obtain one place past the decimal point.

Next, an explanation will follow of method B which is employed when the haze value is large.

II Measurement Method B
(Measurement Principle)

The measurement principle of this method is the same as in measurement method A.

(Apparatus Employed)

The apparatus employed must satisfy the following optical conditions.

Additionally, it is noted here that when the haze value of the test piece is large and thick, the test piece is made in the form of a circular plate in order to capture the radiational scattering light arising from the scattering of the light in the direction of the thickness of the test piece. The test piece is inserted into the test piece holder shown in FIG. 7B and attached to the inner wall of the integrating sphere. A substance which has a metallic glossy surface may be used for this test piece holder.

A reflecting surface is identical to measuring method A.

The light rays in the beam of light which illuminates the test material 54 are almost entirely parallel, and must deviate no more than 3° from the optical axis. The center of the beam of light coincides with the center of the open hole (d). The beam of light is circular in cross-section, and must be visible. Further, the diameter of the light rays in the beam of light in the opening part (d) is 0.5–0.6 times as large as the diameter of the test material. However, the above limitation are not applied when obtaining a reflectance for non-transparent test material.

A light trap 53, a light source 55, and a light receiver 56 are identical to measuring method A.

An integrating sphere 57 is shown in FIG. 7A. The sum (a+b+c+d) of the areas of the light entrance and exit ports must be less than 4% of the total inner surface of the sphere. A center line running between the open hole (d) and a closed hole (f) is on the same large circle of the sphere. The angle formed by the center line running between the open hole (d) and closed hole (f), and the center line running between the open hole (f) and the open hole (e) is within 14°.

Additionally, it is noted here that the diameter of the beam of incident light may be regulated by providing a mask on the light path. In this case, the mask should have a black mat surface finish.

(Test Piece)

The test piece is circular and is of a size to adhere to the inner side of the test piece holder 58. In this case, the side surface of the test piece is coated with a white coating material. Further, three test pieces are employed.

(Measurement Method)

Measurement was carried out as follows using the aforementioned measuring device and test pieces.

(1) The standard white plate is attached to open hole (e) and open hole (f), the indicator on the device is se to 100 ($T_1$), and the amount of incident light is adjusted.

(2) With conditions as provided for in (1), the test piece is attached to open hole (d), and the amount of transmitted light ($T_2$) is measured.

(3) The standard white plate is attache to open hole (f) and the light trap is attached to open hole (e) and the amount of incident light ($T_3$) is measured.

(4) A light trap 43 or a test piece 54 wherein there is attached or black felt is attached to the open hole (f), and a standard white plate 50 is attached to open hole (e), and the amount of reflected light ($T_4$) is measured.

However, the light trap 53 or black felt is not necessary when using a non-transparent test piece 54.

Further, when measuring the reflectance only, the measurements in (1), (3), and (4) may be carried out.

(Method of Calculation)

Next, the obtained measured values were applied to the following formulae.

$$T_1 = T_2 \times 100 / \{2T_1 - T_3 - k(T_1 - T_3)(1 - R)\}$$
$$R = T_4 \times 100 / \{T_1 - k(T_1 - T_3)(1 - T_4/T_1)\}$$

Where,
$T_1$: total light transmittance (%)
$R$: total light ray reflectance (%)
$k$: area of test piece/area of opening (Display Method for Results)

The calculated values for the total light ray transmittance, scattered transmittance, and the parallel light ray transmittance are obtain on place past the decimal point.

Light diffusion capability, particularly diffusion capability with respect to the light from the back light, is required of the aforementioned protective layer 242. With semi-transmissive semi-reflective film laminate 25 which is provided with a protective layer 242 having excellent diffusion capability, outside light or light from back light 1 experiences irregular reflection with good efficiency because of its incidence on or reflection off of semi-transmissive semi-reflective film laminate 25. For this reason, it becomes possible to obtain a uniform image having no density irregularities. Moreover, this is also preferable because it is possible to obtain good image contrast during day and night hours.

Protective layer 242 may be formed using, for example, a an organic solvent soluble resin, a water soluble resin, a variety of rubbers, UV curing resin, or an electric beam curing resin.

The following are available as concrete examples of the organic solvent soluble resin mentioned above: olefin resins such as polyethylene, polypropylene, polybutene, or polybutadiene; acrylate resins such as polymethyl methacrylate or ethylene-ethyl acrylate copolymer; styrene resins such as polystyrene, AS resin, BS resin or ABS resin; vinyl resins such as polyvinyl chloride, polyvinylidene chloride, polyvinyl acetate, ethylene-vinyl acetate copolymer, polyvinyl butyral, vinylidene chloride-acrylonitrile copolymer, vinyl chloride-vinyl acetate copolymer, vinyl chloride-vinylidene chloride copolymer or propylene-vinyl chloride copolymer; a polyamide resin like nylon 6, nylon 66 and nylon 12; saturated polyester resin; polycarbonate resin; polysulfone; epoxy resin; acrylate resin; polyether; polyimide; polyethylene terephthalate; polyacetal resin; polyphenylene oxide resin; polyphenylene sulfide resin; polyurethane resin; fluororesins such as tetrafluoroethylene resin, trifluoroethylene resin, or polyvinylidene fluoride; cellulose resin such as ethylene cellulose, acetyl cellulose, or nitrocellulose; epoxy resin, ionomer resin, or rosin derivatives resin.

Available as the water soluble resin mentioned above are gelatin, glue, hydroxyethylene cellulose, carboxymethyl cellulose, methyl cellulose, carboxymethyl hydroxyethyl cellulose, hydroxyethyl starch, gum arabic, saccjarpse pctaacetate, ammonium alginate, sodium alginate, polyvinyl alcohol, polyvinyl butyral, polyvinyl pyrrolidone, polyvinyl amine, polyethylene oxide, polyethylene sulfonate, polyacrylic acid, polyamide, or isobutylene-maleic anhydride copolymer.

A resin derived from an emulsion which is a mixture of an aforementioned organic solvent soluble resin and a water soluble resin may also be used.

The aforementioned rubber is one selected from but not limited to the class of rubbers which include natural rubber, isobutylene rubber, styrene-butadiene rubber (SBR), butadiene rubber, acrylonitrile-butadeine rubber, butylene-polyethylene rubber, hydrine rubber, urethane rubber, polysulfide rubber, silicon rubber and fluoro rubber, or may be a mixture of these rubbers.

A mixture consisting of organic or inorganic matter and a rubber from the above class of rubbers may also be used.

Examples of the thermosetting resin include the class of unsaturated polyesters, epoxy resin, xylene resin, polyamide-polyimide resin, silicon resin, polyimide resin, polyurethane resin, olefin resin, allyl resin, melamine resin, furan resin, urea resin, phenol resin, phenol-formaldehyde resin, polyester-amino resin and alkyd resin.

Moreover, an electric beam curing resin or a UV curing resin such as acrylic resin or epoxy resin may also be used.

These resins may be used alone, or in mixtures of two or more.

The following pigments may be added to protective layer 242, namely organic pigments such as pigment derived from acrylate resin, melamine resin, urethane resin, silk (amino acid), chitosan, calcium alginate, polymethyl methacrylate, polystyrene resin, phenol resin, silicon resin, silicon rubber, polyethyl methacrylate, styrene cross-linker, styrene BA cross-linker, polyethylene resin, and epoxy resin, and inorganic pigments such as silica, calcium carbonate, quartz, magnesium silicate, titanium oxide, hexagonal boron nitride, aluminum borate, aluminum nitride, silicone nitride, silicone carbonate, and calcium phosphate. These pigments may be used alone, or in mixtures of two or more.

When adding pigments, it is preferable to fix the mixture ratio between the light transmissive resin and the pigment so that the light transmittance of protective layer 242 obtained by adding the pigment is 40% or higher.

In addition to including pigment, it is also possible to provide a vacant space 13 when using a resin film like support 10 of semi-transmissive semi-reflective film laminate 26 explained below. When providing a vacant space 13, the various conditions concerning, for example, the method of forming vacant space 13, the ratio of vacant space 13 with respect to the non-space portion, and the like, are preferably the conditions set forth in the explanation of support 10 which follows below.

Furthermore, additives such as a cross-linking agent or a UV absorbing agent may be used in addition to the pigment.

By adding a cross-linking agent to protective layer 242, the resistance of the semi-transmissive semi-reflective film laminate 25 to high heat and high humidity can be improved. Namely, it is possible to prevent peeling between semi-transmissive semi-reflective layer 241 and polarizing film 23 under the aforementioned condition, as well as to prevent a degradation of the degree of polarization of polarizing film 23. Isocyanate compounds, amino compounds, or epoxy compounds may be suitably used as the cross-linking agent.

Further, by adding such UV absorption agents as benzophenone derivatives, benzotriazole derivatives, salcilate derivatives, or cyanoacrylate derivatives, it is possible to prevent the photolysis of the light transmissive resin in semi-transmissive semi-reflective layer 241.

Protective layer 242 consisting of the aforementioned composition can be provided by being coated or printed on to the obtained semi-transmissive semi-reflective layer 241. Protective layer 242 may also be provided by adhering a transparent sheet material such as film or glass using an adhesive agent or adhesive layer.

Examples of the aforementioned transparent sheet are polyethylene terephthalate (PET), polyimide, polyether, polycarbonate, polyacrylate, polysulfone, cellophane, aromatic polyamide, polyether sulfone, polyethylene, polypropylene, polystyrene resins, polyurethane resins, melamine resins, norvolnene resins, acrylic resins, epoxy resins, phenol resins, all types of cellulose resin, all types of resin film consisting of a copolymer of monomers of these resins, or a glass substrate such as quartz.

When using an adhesive layer or adhesive agent, it is preferable to use an adhesive layer or adhesive agent consisting of material such as acrylic derivatives, urethane derivatives, silicon derivatives or the like.

Figure 8:
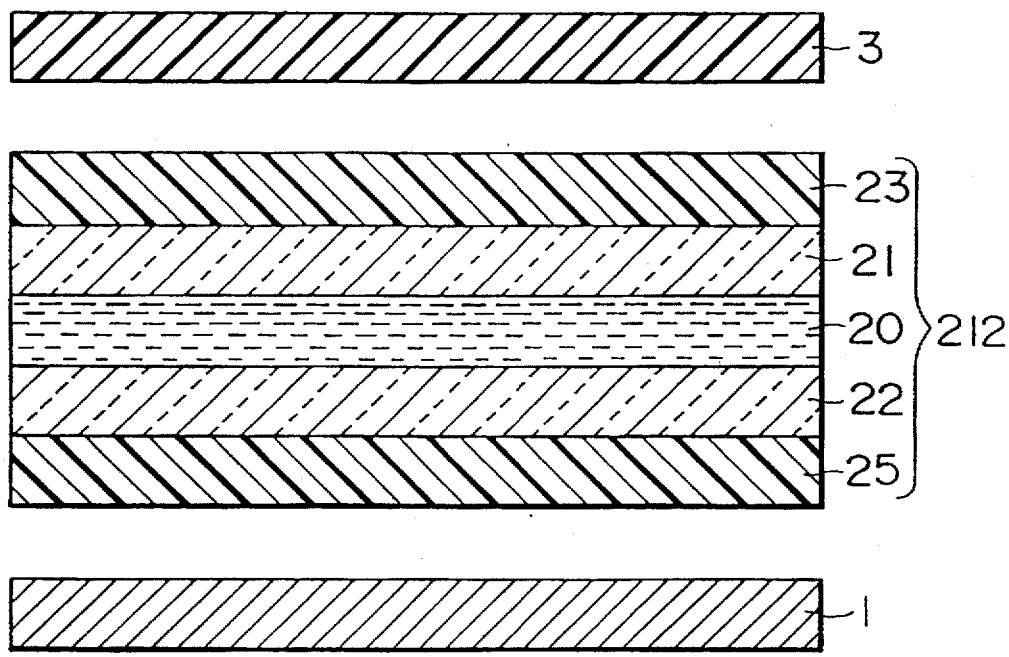
FIG. 8 is a cross-sectional figure showing the liquid crystal display equipped with the semi-transmissive semi-reflective film laminate shown in FIG. 4.

FIG. 8 is a schematic cross-sectional diagram showing the structure of a liquid crystal display wherein image contrast has been improved by using a semi-transmissive semi-reflective film laminate 25 consisting of the above structure.

In this liquid crystal display, a light source 1 such as a leading light plate apparatus (EL) or a lamp is disposed to one surface of the liquid crystal panel 212 provided with the above semi-transmissive semi-reflective film laminate 25. A glass 3 with reflection prevention film is disposed to the other surface of the liquid crystal panel 212.

A twisted nematic (TN) liquid crystal panel or the like may be used in the liquid crystal panel 212. In order to form this liquid crystal panel 212, oriented films consisting of polyimide are coated to the surface of the transparent electrodes of two glass plates 21,22 which are provided with these transparent electrodes that consist of a desired pattern. Next, the oriented films are disposed by means of a rubbing operation, and nematic liquid crystal 20 is injected between the plates. This nematic liquid crystal 20 is disposed with a 90° twist because of the operation of the oriented films. The circumference part of plates 21,22 is then sealed. Next, by adhering polarizing films 23 to one surface of plates 21,22, and adhering semi-transmissive semi-reflective film laminate 25 having the above structure, it becomes possible to obtain the liquid crystal panel 212. However, semi-transmissive semi-reflective film laminate 25 and the polarizing film 23 must be adhered so that the polarizing angles are mutually twisted.

When the drive signal is applied to the transparent electrode of the liquid crystal panel 212, an electric field is generated between the electrodes to which the signal has been transmitted. At this time, because of the liquid crystal molecules' electronic anisotropy, the long axis of the liquid crystal molecules orients parallel to the direction of the electric field. For this reason, the light's optical activity due to the liquid crystal molecules is lost, and a situation results where the light is not transmitted. The image display is recognized as visual information through contrast from the difference between the light transmission when the drive signal was transmitted to the transparent electrode and the light transmission when it was not.

The reason why it is possible to achieve good image contrast with either transmitted light or reflected light is that semi-transmissive semi-reflective layer 241 of semi-transmissive semi-reflective film laminate 25 can transmit with good efficiency the light from back light 1 which is the light source in a dark area, and can reflect with good efficiency the outside light which reaches semi-transmissive semi-reflective layer 241 in a bright area.

Figure 9:
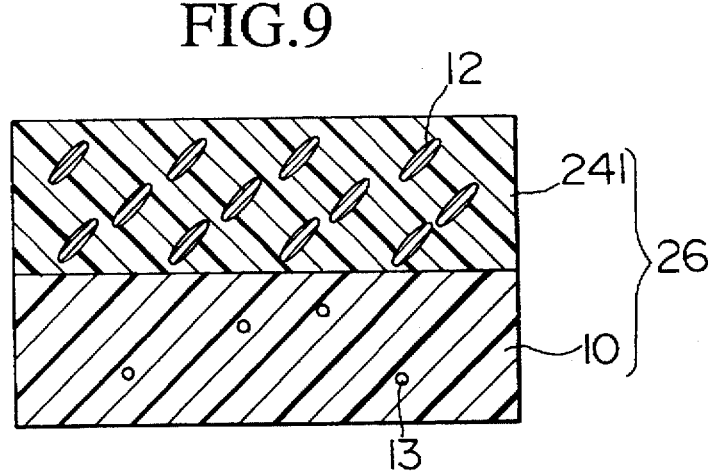
FIG. 9 is a cross-sectional figure showing a schematic of the semi-transmissive semi-reflective film laminate consisting of a support having a vacant space and a semi-transmissive semi-reflective layer.

Next, using FIG. 9, another semi-transmissive semi-reflective film laminate 26 of the present invention will be explained. This semi-transmissive semi-reflective film laminate 26 is formed of a semi-transmissive semi-reflective layer 241 and a support member 10 having a vacant space 13 internally.

A semi-transmissive semi-reflective layer identical to the semi-transmissive semi-reflective layer 241 described above using FIGS. 1 and 4 may be used.

As was the case for polarizing film 23 described above, support member 10 must have good light diffusion capability, particularly with respect to the light from the back light.

A transparent material such as film or glass may be used as the material for obtaining support member 10 provided with excellent diffusion capability.

Examples of the material which forms support member 10 are polyethylene terephthalate (PET), polyimide, polyether, polycarbonate, polyacrylate, polysulfone, cellophane, aromatic polyamide, polyether sulfone, polyethylene, polypropylene, polystyrene resins, polyurethane resins, melamine resins, norvolnene resins, acrlyic resins, epoxy resins, phenol resins, all types of cellulose resins, all types of resin film consisting of a copolymer of monomers of these resins, or a glass substrate such as quartz.

However, it is preferable that a material wherein the average value of the transmittance of simple light rays in the visible light region is 75% or greater be used as the material for support member 10. When the average value of the transmittance of simple light rays falls below 75%, the transmittance of light rays is not good, making it impossible to obtain good image contrast from the back light. The "diffusion rate of simple light rays" noted here indicates the value which is calculated from the aforementioned formula (1).

In addition to using a light transmissive resin having the above characteristics in order to obtain support member 10 which is provided with excellent diffusion capability, it is necessary to provide a vacant space 13 therein. A transmissive resin having a vacant space 13 therein can scatter light with good efficiency because of the difference in the refraction between the vacant space 13 and the non-vacant space portion of the resin. Moreover, because almost no light is absorbed by the vacant space 13, it is possible to obtain good transmitted light.

Vacant space 13 can, for example, be formed by the following method.

As one method, an inorganic pigment such as calcium carbonate is added in very small amounts to the resin which will be the matrix of the film which forms the support body 10, and is then drawn out. In this method, a vacant space 13 is formed inside the film because the matrix resin, with the inorganic pigment as its point of support, can be pulled and ripped.

As another method, a foaming agent is added to the light transmissive resin which will be the matrix of the film, and undergoes heat foaming in the drawing out step. In this method, by heating a foaming agent, a vacant space 13 is formed inside the light transmissive resin.

As yet another method, hollow particles consisting of an organic high molecular material such as styrene-acryl copolymer or of an inorganic material such as quartz glass or the like is added to a light transmissive resin which will be the matrix of the film, and is drawn out, forming a film. In this manner, a vacant space 13 is formed inside the film.

The present invention is not limited to these methods but rather any method may be employed to form vacant space 13.

The shape of vacant space 13 is not limited particularly and may, for example, be spherical or of an irregular shape. However, the size of the vacant space 13 is preferably larger than the wavelength of visible light rays so that it can scatter the visible light rays.

A liquid crystal display wherein the image contrast has been improved by using a semi-transmissive semi-reflective film laminate 26 which is provided with a support member 10 which has a vacant space 13 consisting of the above structure will now be explained using FIG. 10.

This liquid crystal display is formed of a liquid crystal panel 2 and a light source 1. Further, liquid crystal panel 2 is formed of a liquid crystal laminate 112 and a semi-transmissive semi-reflective layer 26. Each of the respective layers have a positional relationship such that liquid crystal laminate 112 is disposed to the top surface of semi-transmissive semi-reflective layer 241, and light source 1 such as a leading light plate apparatus (EL) or a lamp, and particularly the back light, is disposed to the bottom surface of semi-transmissive semi-reflective layer 241.

A twisted nematic (TN) liquid crystal panel, for example, may be used in liquid crystal laminate 112. In forming liquid crystal laminate 112, oriented films consisting of polyimide are coated on to the surfaces of the transparent electrodes of two glass plates 21,22 which are provided with these transparent electrodes that consist of a desired pattern. Next, the oriented film are disposed by means of a rubbing operation, and nematic liquid crystal 20 is injected between the plates. This nematic liquid crystal 20 is disposed with a twist because of the action of the oriented film. The circumference part of glass plates 21,22 is then sealed. Polarizing films 23,23 may be applied to the outside of each of the glass plates so that the polarizing angles are mutually twisted 90°.

Next, semi-transmissive semi-reflective layer 241 is placed on top of polarizing film 23 of the obtained liquid crystal laminate 112.

The polarizing films 22,23 applied to the outside of the glass plates may be films comprised homogeneously or heterogeneously.

Alternatively, semi-transmissive semi-reflective layer 241 may be adhered to polarizing film 23 by a method described below. In this manner, liquid crystal panel 2 is produced.

The surface of semi-transmissive semi-reflective film laminate 26 which contacts liquid crystal laminate 112 is laminated so that the semi-transmissive semi-reflective layer 241 side contacts liquid crystal laminate 112. In order to improve productivity of the liquid crystal display device, semi-transmissive semi-reflective layer 241 and liquid crystal laminate 112 may be adhered together using an adhesive agent or adhesive tape consisting of acrylic resins, polyester resins, or urethane resins such as epoxy resins, phenol resins or vinyl resins, to create a unitary structure for use.

When the drive signal is applied to the transparent electrodes of the liquid crystal panel 2, an electric field is generated between the electrodes to which a signal has been transmitted. At this time, because of the liquid crystal molecules' electronic anisotropy, the long axis of the liquid crystal molecules orients parallel to the direction of the electric field. For this reason, the light's optical activity due to the liquid crystal molecules is lost, and a situation results where the light is not transmitted. The image display is recognized as visual information through contrast from the difference between the light transmission when the drive signal was transmitted to the transparent electrode and the light transmission when it was not.

EXPERIMENTAL EXAMPLES

The present invention will now be explained using experimental examples. Additionally, it is noted here that the term "parts" is meant to indicate "parts by weight".

(Example 1)

A semi-transmissive semi-reflective layer coating solution (viscosity: 2000 cps) consisting of the following composition was applied to the surface of a polarizing film 23 (SUNRITZ ltd., commercial name: LL-82-18) using three-rollers reverse coating method (shear rate between applicator roller and polarizing film: $5 \times 10^4$ sec$^{-1}$). Then, drying was carried out for two minutes at 120° C., thereby obtaining a semi-transmissive semi-reflective film laminate 24 having a 20 μm thick semi-transmissive semi-reflective layer 241.

| | |
|---|---|
| polyester resin (Toyobo, commercial name: VYLON 200) | 60 parts |
| pearl pigment (Merck Japan, commercial name: IRIODIN #120, average particle diameter: 10 μm) | 40 parts |
| cyclohexanone | 50 parts |
| methyl ethyl ketone | 50 parts |
| toluene | 50 parts |

The weight ratio of the solid material of the pearl pigments to the solid component of the resin in this composition is 40:60.

(Example 2)

The semi-transmissive semi-reflective film laminate 24 in this example was obtained in the same way as in Example 1 with the exception that the semi-transmissive semi-reflective layer coating solution was changed to a coating solution (viscosity: 1500 cps) consisting of the following composition.

| | |
|---|---|
| polyester resin (Toyobo, commercial name: VYLON 200) | 40 parts |
| epoxy resin | 40 parts |

| | |
|---|---|
| (YUKA SHELL EPOXY, commercial name: EPICOAT 1007) | |
| pearl pigment | 20 parts |
| (Merck Japan, commercial name: IRIODIN #100, average particle diameter: 20 μm) | |
| cyclohexanone | 50 parts |
| methyl ethyl ketone | 50 parts |
| toluene | 50 parts |

The weight ratio of the solid material of the pearl pigment to the solid component of the resin in this composition is 20:80.

(Example 3)

With the exception of setting the thickness of the semi-transmissive semi-reflective layer 241 to 100 μm, the semi-transmissive semi-reflective film laminate 24 in this example was obtained in the same way as in Example 1. The shear rate between the applicator roller and the polarizing film in this example was $1 \times 10^4$ sec$^{-1}$.

(Example 4)

With the exception of employing a semi-transmissive semi-reflective layer coating solution wherein viscosity is decreased to 1900 cps by increasing the quantity of a mixed solvent consisting of cyclohexane, methyl ethyl ketone and toluene with respect to pearl pigments which had an average particle diameter of 200 μm, the semi-transmissive semi-reflective film laminate 24 in this example was obtained in the same manner as in Example 1.

(Example 5)

With the exception of setting the thickness of the semi-transmissive semi-reflective layer 241 to 10 μm, the semi-transmissive semi-reflective film laminate 24 in this example was obtained in the same manner as Example 1. The shear rate in this example between the polarizing film and the applicator roller was $1 \times 10^5$ sec$^{-1}$.

(Example 6)

With the exception of employing a semi-transmissive semi-reflective layer coating solution wherein viscosity is increased to 3000 cps by decreasing the quantity of a mixed solvent with respect to pearl pigments which had an average particle diameter of 6 μm, the semi-transmissive semi-reflective film laminate 24 in this example was obtained in the same manner as in Example 1.

(Example 7)

With the exception of employing a semi-transmissive semi-reflective layer coating solution wherein the weight ratio of the solid material of the pearl pigments to the resin is 60:40 and the viscosity is increased to 2800 cps by decreasing the quantity of a mixed solvent, the semi-transmissive semi-reflective film laminate 24 in this example was obtained in the same manner as in Example 1.

(Example 8)

With the exception of employing a semi-transmissive semi-reflective layer coating solution wherein the weight ratio of the solid material of the pearl pigment to the resin is 5:95 and the viscosity is increased to 2500 cps by decreasing the quantity of the mixed solvent, the semi-transmissive semi-reflective film laminate 24 in this example was obtained in the same manner as in Example 1.

(Example 9)

A semi-transmissive semi-reflective layer coating solution (viscosity 2500 cps) consisting of the following composition was applied to the surface of a polarizing film 23 (TOYOBO, commercial name: H-1212, simple light ray transmittance: 55%, material: polyethylene terephthalate) using a blade coater. Then, drying was carried out for two minutes at 120° C., thereby obtaining a semi-transmissive semi-reflective film laminate 24 having a semi-transmissive semi-reflective layer 241 of thickness of 20 μm.

| | |
|---|---|
| acryl adhesive agents | 70 parts |
| (SOKENKAGAKU, commercial name: TM-150, solid component: 25%) | |
| pearl pigment | 30 parts |
| (Merck Japan, commercial name: IRIODIN #100, average particle diameter: 20 μm) | |
| cyclohexanone | 50 parts |
| methyl ethyl ketone | 50 parts |
| toluene | 50 parts |

The weight ratio of the solid material of the pearl pigment to the solid material of the resin in this composition is 30:70.

(Example 10)

The semi-transmissive semi-reflective film laminate 24 was obtained by treating polarizing film 23 (SUNRITZ ltd., commercial name: LL-82-18) as in Example 1 above. Next, using a wire doctor, a UV curing resin (ASAHIDENKA, commercial name: KR-566, simple light ray transmittance: 94%) consisting of a epoxy acrylate resin was applied on top of semi-transmissive semi-reflective layer 241. The resin was then hardened using UV illumination, providing a protective layer 242 on top of semi-transmissive semi-reflective layer 241 and thereby obtaining a semi-transmissive semi-reflective film laminate 25.

(Example 11)

Using three-rollers reverse coating method (shear rate between applicator roller and polarizing film: $5 \times 10^4$ sec$^{-1}$), a semi-transmissive semi-reflective layer coating solution consisting of the following composition was applied on to a surface treated with silicon release agent of 50 μm polyethylene terephthalate film which is used as a transferring sheet. Drying was then carried out for 1 minute at 120° C., forming a semi-transmissive semi-reflective layer 241 of thickness 20 μm. The obtained semi-transmissive semi-reflective layer 241 was adhered to polarizing film 23 (SUNRITZ, commercial name: LL-82-18) using an application roller heated to 80° C. The polyethylene terephthalate film having surface treated with silicon release agent was released and removed, thereby obtaining the semi-transmissive semi-reflective film laminate 24 of the present example.

| | |
|---|---|
| polyester resin | 60 parts |
| (Toyobo, commercial name: VYLON 200) | |
| pearl pigment | 40 parts |
| (Merck Japan, commercial name: IRIODIN #120, average particle diameter: 10 μm) | |
| cyclohexanone | 50 parts |
| methyl ethyl ketone | 50 parts |
| toluene | 50 parts |

The weight ratio of the solid material of the pearl pigment to the solid material of the resin in this composition is 40:60.

(Comparative Example 1)

With the exception of substituting silica (FUJISHIRISHIAKAGAKU, commercial name: SYRISIA

550, average particle diameter: 3.0 µm) for the pearl pigments 12 which is included in semi-transmissive semi-reflective layer 241, the semi-transmissive semi-reflective film laminate 24 of this comparative example was obtained in the same way as in Example 1.

(Comparative Example 2)

With the exception of substituting aluminum hydroxide (SHOWADENKO, commercial name: HYGILLITE H-42, average particle diameter: 1.0 µm) for the pearl pigments 12 which are included in semi-transmissive semi-reflective layer 241, the semi-transmissive semi-reflective film laminate 24 of this comparative example was obtained in the same way as in Example 1.

(Comparative Example 3)

With the exception of excluding pearl pigments 12 from the semi-transmissive semi-reflective layer 241, the semi-transmissive semi-reflective film laminate 24 of this comparative example was obtained in the same way as in Example 1.

(Comparative Example 4)

With the exception of forming semi-transmissive semi-reflective layer 241 by means of a Screen printing method, the semi-transmissive semi-reflective film laminate 24 of this comparative example was obtained in the same way as in Example 1.

(Comparative Example 5)

Using a Gravure printing method, a semi-transmissive semi-reflective layer coating solution (viscosity: 30 cps) consisting of the following composition was applied on to polarizing film 23 (SUNRITZ, commercial name: LL-82-18). Drying was then carried out for 2 minutes at 120° C., forming a semi-transmissive semi-reflective layer 241 of thickness 20 µm, thereby obtaining the semi-transmissive semi-reflective film laminate 24 of this comparative example.

| | |
|---|---|
| polyester resin (Toyobo, commercial name: VYLON 220, solid component: 30%) | 60 parts |
| pearl pigment (Merck Japan, commercial name: IRIODIN #100, average particle diameter: 20 µm) | 40 parts |
| cyclohexanone | 300 parts |
| methyl ethyl ketone | 300 parts |
| toluene | 300 parts |

The weight ratio of the solid material of the pearl pigment to the solid material of the resin in this composition is 40:60.

(Comparative Example 6)

Viscosity was decreased to 80 cps by increasing the quantity of mixed solvent with respect to the 100 parts of semi-transmissive semi-reflective layer coating solution employed in Example 1. Other than this variation, this comparative example was carried out in the same manner as in Example 1 to obtain semi-transmissive semi-reflective film laminate 24.

Next, the following measurements were carried out for the semi-transmissive semi-reflective film laminates 24 obtained in the preceding examples and comparative examples.

(1) Angle of Orientation of Pearl Pigments

Optionally selected cross-sections were made of the semi-transmissive semi-reflective film laminates 24 obtained in the preceding examples and comparative examples, and were photographed using SEM. 100 pearl pigments were optionally selected, their angles of disposition measured, and the average value thereof calculated. These values are shown in Table 1.

(2) Image Contrast of Liquid Crystal Panel 2

A liquid crystal panel 222 was obtained from the semi-transmissive semi-reflective film laminates 24 obtained in the preceding examples and comparative examples, polarizing film 23 (SUNRITZ ltd., commercial name: LL-82-18), and liquid crystal injected structure 102 into which TN liquid crystal has been injected. Next, in conformity with the method described in JIS C7072 1988 for measuring the contrast ratio (CR) of a liquid crystal display panel, an evaluation of the image contrast of the obtained liquid crystal panel 222 was performed.

The contrast ratio (CR) was a ratio between a luminance of the liquid crystal panel being applied operating voltage (Y2) and a luminance thereof not being applied operating voltage (Y1), and shown by Y1/Y2.

Figure 11:
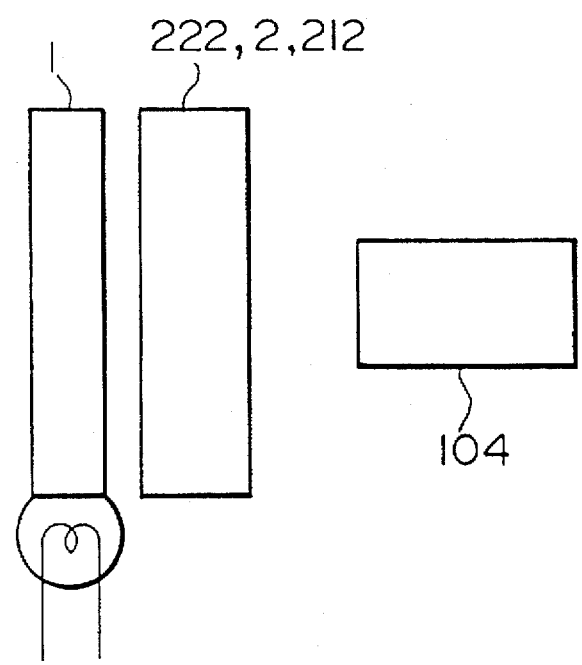
FIG. 11 is a structural diagram showing the positional relationship between a photometer, a liquid crystal panel and a light source for the case where measuring image contrast ratios using transmitted light from a liquid crystal display which improves image contrast by using the semi-transmissive semi-reflective film laminates shown in FIGS. 1, 4, and 9.
Figure 12:
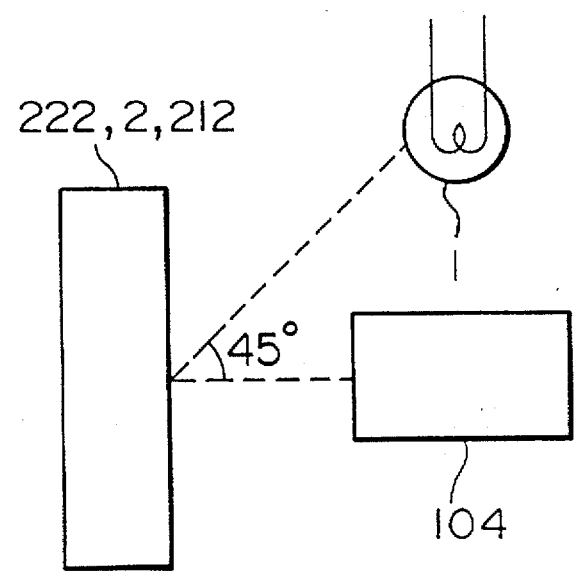
FIG. 12 is a structural diagram showing the positional relationship between a photometer, a liquid crystal panel and a light source for the case where measuring image contrast ratios using reflected light from a liquid crystal display which improves image contrast by using the semi-transmissive semi-reflective film laminate shown in FIGS. 1, 4 and 9.

The positional relationship between light source 1, liquid crystal panel 222 and photometer 104 in the evaluation of image contrast using transmitted light is shown in FIG. 11, while the positional relationship using reflected light is shown in FIG. 12. In particular, in the measurement using reflected light, the angle between light source 1, liquid crystal panel 222 and photometer 104 was set to 45°.

A 5 W EL was used when the light source was transmitted light, and a 40 W fluorescent light was used when the light source was reflected light. The model of photometer employed was an LS-100 photometer manufactured by Minolta Camera. The results of the measurements are shown in Table 2.

In the following Tables 1 and 2, the symbol "*" indicates a CR of 4 or greater, "o" a CR in the range of 3 to less than 4, and a "X" a CR in the range of 2 to less than 3. "XX" indicates a CR of less than 2.

(Example 12)

Polyethylene terephtlate film (TOYOBO, commercial name: KURYSPER H-1212 50) having a thickness of 50 µm which has a vacant space 13 therewithin was employed as a support member 10. Semi-transmissive semi-reflective layer coating solution which forms the semi-transmissive semi-reflective layer of the following composition was applied onto support member 10 using three-rollers reverse coating method (shear rate between applicator roller and polarizing film: $5 \times 10^4$ sec$^{-1}$). Next, after drying for one minute at 100° C., the semi-transmissive semi-reflective film laminate 26 of this example having a 20 µm thick semi-transmissive semi-reflective layer 241 was obtained.

| | |
|---|---|
| polyester resin (TOYOBO, commercial name: VYLON 200) | 80 parts |
| pearl pigment (Merck Japan, commercial name: IRIODIN #120, average particle diameter 10 µm) | 20 parts |
| methyl ethyl ketone | 100 parts |
| methyl isobutyl ketone | 50 parts |

The average value of the transmittance of simple light rays in the visible light region of the polyester resin which is the light transmissive resin used in this example was 83%.

(Example 13)

With the exception of substituting polyethylene terephthalate film (TOYOBO, commercial name: KURYSPER H-1212 75) having a thickness of 75 μm and a vacant space 13 therewithin for the support member 10, the semi-transmissive semi-reflective film laminate 26 of this example was obtained in the same manner as in Example 12.

(Example 14)

With the exception of using polypropylene film (OJIYUKA, commercial name: YUPO EP-G45) having a thickness of 45 μm and a vacant space 13 therewithin as the support member 10, the semi-transmissive semi-reflective film laminate 26 of this example was obtained in the same manner as in Example 12.

(Example 15)

With the exception of changing the composition of semi-transmissive semi-reflective layer coating solution as follows, the semi-transmissive semi-reflective film laminate 26 of this example was obtained in the same manner as in Example 12.

| | |
|---|---|
| polyester resin (TOYOBO, commercial name: VYLON 200) | 20 parts |
| nitrocellulose (DAISERUKAGAKU, commercial name: RS20) | 40 parts |
| pearl pigment (Merck Japan, commercial name: IRIODIN #151, average particle diameter 35 μm) | 40 parts |
| methyl ethyl ketone | 100 parts |
| cyclohexane | 50 parts |

The average value of the transmittance of simple light rays in the visible light region of the polyester resin which is the light transmissive resin used in this example was 83%.

(Example 16)

With the exception of changing the composition of the semi-transmissive semi-reflective layer coating solution as follows, the semi-transmissive semi-reflective film laminate 26 of this example was obtained in the same manner as in Example 12.

| | |
|---|---|
| polyvinyl alcohol (NIHON GOSEIKAGAKU KOGYO, commercial name: GOSENOL OKS3266L) | 80 parts |
| pearl pigment (Merck Japan, commercial name: IRIODIN #111, average particle diameter 6 μm) | 20 parts |
| isopropyl alcohol | 200 parts |
| water | 100 parts |

The average value of the transmittance of simple light rays in the visible light region of the polyvinyl alcohol which is the light transmissive resin used in this example was 89%.

(Example 17)

With the exception of substituting polystyrene (SUMITOMOKAGAKU, commercial name: ERASTYRENE, transmittance: 75%) for the light transmissive resin of the semi-transmissive semi-reflective layer, the semi-transmissive semi-reflective film laminate 26 of this example was obtained in the same manner as in Example 12.

(Example 18)

With the exception of setting the thickness of the semi-transmissive semi-reflective layer to 100 μm, and the P/B ratio to 6/94, the semi-transmissive semi-reflective film laminate 26 of this example was obtained in the same manner as in Example 12.

(Example 19)

With the exception of setting the thickness of the semi-transmissive semi-reflective layer to 0.5 μm, the semi-transmissive semi-reflective film laminate 26 of this example was obtained in the same manner as in Example 15.

(Example 20)

With the exception of setting the average particle diameter of the pearl pigments to 200 μm, the semi-transmissive semi-reflective film laminate 26 of this example was obtained in the same manner as in Example 12.

(Example 21)

With the exception of setting the average particle diameter of the pearl pigments to 0.8 μm, the semi-transmissive semi-reflective film laminate 26 of this example was obtained in the same manner as in Example 12.

(Example 22)

With the exception of setting the average particle diameter of the pearl pigments to 220 μm, the semi-transmissive semi-reflective film laminate 26 of this example was obtained in the same manner as in Example 12.

(Example 23)

With the exception of setting the thickness of the semi-transmissive semi-reflective layer to 110 μm, the semi-transmissive semi-reflective film laminate 26 of this example was obtained in the same manner as in Example 12.

(Example 24)

With the exception of setting the thickness of the semi-transmissive semi-reflective layer to 0.2 μm, the semi-transmissive semi-reflective film laminate 26 of this example was obtained in the same manner as in Example 12.

(Example 25)

With the exception of setting the average particle diameter of the pearl pigment to 1.0 μm, the semi-transmissive semi-reflective film laminate 26 of this example was obtained in the same manner as in Example 12.

(Example 26)

With the exception of setting the P/B ratio to 50/50, the semi-transmissive semi-reflective film laminate 26 of this example was obtained in the same manner as in Example 12.

(Example 27)

With the exception of changing the composition of semi-transmissive semi-reflective layer 241 as follows, this semi-transmissive semi-reflective film laminate 26 of this example was obtained in the same manner as in Example 12.

| | |
|---|---|
| polyester resin (TOYOBO, commercial name: VYLON 200) | 25 parts |
| nitrocellulose (DAISERUKAGAKU, commercial name: RS20) | 15 parts |

| | |
|---|---|
| pearl pigment (Merck Japan, commercial name: IRIODIN #120, average particle diameter 10 μm) | 60 parts |
| methyl ethyl ketone | 100 parts |
| cyclohexanone | 50 parts |

The average value of the transmittance of simple light rays in the visible light region of the polyester resin which is the light transmissive resin used in this example was 83%.

(Example 28)

With the exception of setting the P/B ratio to 3/97, the semi-transmissive semi-reflective film laminate 26 of this example was obtained in the same manner as in Example 12.

The average value of the transmittance of simple light rays in the visible light region of the polyester resin which is the light transmissive resin used in this example was 85%.

(Comparative Example 7)

With the exception of substituting for support member 10 transparent polyethylene terephthalate having a thickness of 100 μm wherein there is no vacant space 13 formed, a semi-transmissive semi-reflective film laminate 26 for comparative purposes was obtained in the same manner as in Example 15.

(Comparative Example 8)

With the exception of substituting silica (FUJISHIRISHIAKAGAKU, commercial name: SYRISIA #550, average particle diameter: 3.0 μm) for the pearl pigments 12 in the semi-transmissive semi-reflective layer 241, a semi-transmissive semi-reflective film laminate 26 for comparative purposes was obtained in the same manner as in Example 13.

(Comparative Example 9)

With the exception of substituting aluminum hydroxide (SHOWADENKO, commercial name: HYGILLITE H-42, average particle diameter: 1.0 μm) for the pearl pigments 12 in the semi-transmissive semi-reflective layer 241, a semi-transmissive semi-reflective film laminate 26 for comparative purposes was obtained in the same manner as in Example 13.

(Comparative Example 10)

With the exception of omitting the pearl pigments 12 in the semi-transmissive semi-reflective layer 241, a semi-transmissive semi-reflective film laminate 26 for comparative purposes was obtained in the same manner as in Example 12.

(Example 29)

Using three-rollers reverse coating method (shear rate between applicator roller and polarizing film: $5 \times 10^4$ sec$^{-1}$), a semi-transmissive semi-reflective layer coating solution consisting of the following composition was applied on to 50 μm thick polyethylene terephthalate film (FUJI Film, commercial name: HP-7) which becomes the protective layer 242. Drying was then carried out for 1 minute at 120° C., forming a semi-transmissive semi-reflective layer 241 having a thickness of 20 μm. The obtained semi-transmissive semi-reflective layer 241 was adhered to polarizing film 23 (SUNRITZ, commercial name: LL-82-18) using an application roller heated to 80° C., thereby obtaining the semi-transmissive semi-reflective film laminate 25 of the present example.

| | |
|---|---|
| polyester resin (Toyobo, commercial name: VYLON 220, solid component: 30%) | 20 parts |
| pearl pigment (Merck Japan, commercial name: IRIODIN #100, average particle diameter: 20 μm) | 4 parts |
| cyclohexanone | 9 parts |

(Example 30)

With the exception of changing the composition of the semi-transmissive semi-reflective layer coating solution as follows, the semi-transmissive semi-reflective film laminate 25 of this example was obtained in the same way as in Example 29.

| | |
|---|---|
| polyester resin (Toyobo, commercial name: VYLON 220, solid component: 30%) | 23 parts |
| pearl pigment (Merck Japan, commercial name: IRIODIN #100, average particle diameter: 20 μm) | 3 parts |
| cyclohexanone | 7 parts |

(Example 31)

With the exception of setting the thickness of the semi-transmissive semi-reflective layer 241 to 100 μm, the semi-transmissive semi-reflective film laminate 25 of this example was obtained in the same way as in Example 29.

(Example 32)

With the exception of setting the average particle diameter of the pearl pigments 12 included in the semi-transmissive semi-reflective layer 241 to 200 μm, the semi-transmissive semi-reflective film laminate 25 of this example was obtained in the same way as in Example 29.

(Example 33)

With the exception of setting the thickness of the semi-transmissive semi-reflective layer 241 to 10 μm, the semi-transmissive semi-reflective film laminate 25 of this example was obtained in the same way as in Example 29.

(Example 34)

With the exception of setting the average particle diameter of the pearl pigments 12 included in the semi-transmissive semi-reflective layer 241 to 2 μm, the semi-transmissive semi-reflective film laminate 25 of this example was obtained in the same way as in Example 29.

(Example 35)

With the exception of setting the weight ratio between the pearl pigments 12 and the light transmissive resin included in the semi-transmissive semi-reflective layer 241 to 60/40, the semi-transmissive semi-reflective film laminate 25 of this example was obtained in the same way as in Example 29.

(Example 36)

With the exception of setting the weight ratio between the pearl pigment 12 and the resin included in the semi-transmissive semi-reflective layer 241 to 5/95, the semi-transmissive semi-reflective film laminate 25 of this example was obtained in the same way as in Example 29.

(Example 37)

With the exception of employing a 75 μm thick polyethylene terephthalate film (TOYOBO, commercial name: H-1212, simple light ray transmittance: 40%), in which a vacant space 13 has been formed, as the protective layer 242, the semi-transmissive semi-reflective film laminate 25 of this example was obtained in the same way as in Example 29.

(Example 38)

With the exception of employing a 50 μm thick polyethylene terephthalate film (TOYOBO, commercial name: H-1212, simple light ray transmittance: 55%), in which a vacant space 13 has been formed, as the protective layer 242, the semi-transmissive semi-reflective film laminate 25 of this example was obtained in the same way as in Example 29.

(Example 39)

In contrast to Example 30 where semi-transmissive semi-reflective layer 241 and polarizing film 23 were sequentially provided on to protective layer 242, in this example, the semi-transmissive semi-reflective layer 241 of Example 19 was provided on top of the polarizing film 23 of the Example 19. Then, a UV resin (ASAHIDENKA, commercial name: KR-566, simple light ray transmittance: 94%) was applied to semi-transmissive semi-reflective layer 241 using a wire doctor. The UV resin was cured using a UV illuminator, forming a 3 μm thick protective layer 242.

(Example 40)

With the exception of providing a protective layer 242 consisting of the following composition, the semi-transmissive semi-reflective film laminate 25 of this example was obtained in the same manner as in Example 39.

| | |
|---|---|
| UV resin (epoxy acrylate resin, ASAHIDENKA, commercial name: KR-566) | 8 parts |
| pigment (silica, FUJISHIRISHIAKAGAKU, commercial name: SYRISHIA #550, average particle diameter 3.0 μm) | 2 parts |
| isopropyl alcohol | 23 parts |

(Example 41)

With the exception of setting the average particle diameter of the pearl pigment 12 included in the semi-transmissive semi-reflective layer 241 to 10 μm, the semi-transmissive semi-reflective film laminate 25 of this example was obtained in the same manner as in Example 29.

(Example 42)

With the exception of setting the average particle diameter of the pearl pigments 12 included in the semi-transmissive semi-reflective layer 241 to 100 μm, the semi-transmissive semi-reflective film laminate 25 of this example was obtained in the same manner as in Example 29.

(Example 43)

With the exception of setting the weight ratio between the pearl pigments 12 and the light transmissive resin included in the semi-transmissive semi-reflective layer 241 to 20/80, the semi-transmissive semi-reflective film laminate 25 of this example was obtained in the same manner as in Example 29.

(Example 44)

With the exception of setting the weight ratio between the pearl pigments 12 and the light transmissive resin included in the semi-transmissive semi-reflective layer 241 to 45/55, the semi-transmissive semi-reflective film laminate 25 of this example was obtained in the same manner as in Example 29.

(Example 45)

With the exception of setting the thickness of the semi-transmissive semi-reflective layer 241 to 10 μm, the semi-transmissive semi-reflective film laminate 25 of this example was obtained in the same manner as in Example 29.

(Example 46)

With the exception of setting the thickness of the semi-transmissive semi-reflective layer 241 to 45 μm, the semi-transmissive semi-reflective film laminate 25 of this example was obtained in the same manner as in Example 29.

(Example 47)

With the exception of using a acrylic adhesive agent (SOKENKAGAKU, commercial name: TM-150, solid material: 25%) as the light transmissive resin in the semi-transmissive semi-reflective layer 241, and not carrying out heat processing during adhering of the semi-transmissive semi-reflective layer 241 and polarizing film 23, the semi-transmissive semi-reflective film laminate 25 of this example was obtained in the same manner as in Example 29.

(Comparative Example 11)

With the exception of substituting silica (FUJISHIRISHIAKAGAKU, commercial name: SYRISIA #550, average particle diameter: 3.0 μm) for the pearl pigment 12 in the semi-transmissive semi-reflective layer 241, the semi-transmissive semi-reflective film laminate 25 in this comparative example was obtained in the same manner as in Example 29.

(Comparative Example 12)

With the exception of substituting aluminum hydroxide (SHOWADENKO, commercial name: HYGILLITE H-42, average particle diameter: 1.0 μm) for the pearl pigment 12 in the semi-transmissive semi-reflective layer 241, the semi-transmissive semi-reflective film laminate 25 in this comparative example was obtained in the same manner as in Example 29.

(Comparative Example 13)

With the exception of omitting the pearl pigments 12 in the semi-transmissive semi-reflective layer 241, the semi-transmissive semi-reflective film laminate 25 in this comparative example was obtained in the same manner as in Example 29.

Figure 10:
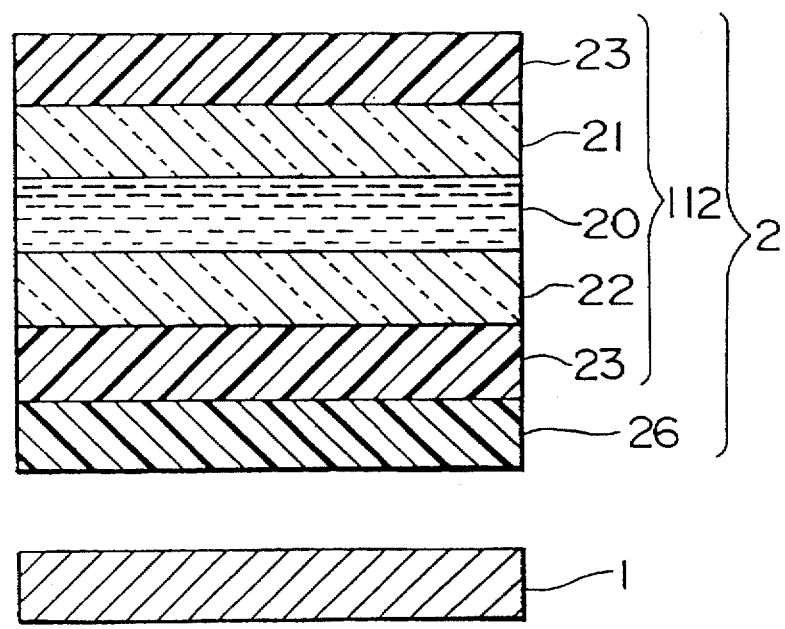
FIG. 10 is a cross-sectional figure showing a liquid crystal display equipped with the semi-transmissive semi-reflective film laminate shown in FIG. 9.

The semi-transmissive semi-reflective film laminates 26 obtained in Examples 12–28 and Comparative Examples 7–10 were adhered to polarizing films 23 of the liquid crystal display 112 shown in FIG. 10, obtaining the liquid crystal panel 2. Next, as is explained in detail below, in conformity with method described in JIS C7072 1988 for measuring the contrast ratio (CR) of a liquid crystal display panel, an evaluation of the image contrast of the obtained liquid crystal panel 2 was performed.

less than 4, and a "X" a CR in the range of 2 to less than 3. "XX" indicates a CR of less than 2.

TABLE 1

| | | semi-transmissive semi-reflective layer | | pearl pigment | |
|---|---|---|---|---|---|
| | P/B ratio | transmittance of light rays of light transmissive resin (%) | thickness (μm) | average particle diameter (μm) | angle of orientation (°) |
| Example 1 | 40/60 | 90 | 20 | 10 | 5 |
| Example 2 | 20/80 | 90 | 20 | 20 | 2 |
| Example 3 | 40/60 | 90 | 100 | 10 | 10 |
| Example 4 | 40/60 | 90 | 20 | 200 | 25 |
| Example 5 | 40/60 | 90 | 10 | 10 | 8 |
| Example 6 | 40/60 | 90 | 20 | 6 | 4 |
| Example 7 | 60/40 | 90 | 20 | 10 | 14 |
| Example 8 | 5/95 | 90 | 20 | 10 | 5 |
| Example 9 | 30/70 | 92 | 20 | 20 | 4 |
| Example 10 | 40/60 | 94 | 20 | 10 | 4 |
| Example 11 | 40/60 | 90 | 20 | 10 | 5 |
| Comparative Example 1 | 40/60 | 90 | 20 | (3)*1 | — |
| Comparative Example 2 | 40/60 | 90 | 20 | (1)*1 | — |
| Comparative Example 3 | 0/100 | 90 | 20 | — | — |
| Comparative Example 4 | 40/60 | 90 | 20 | 20 | 37 |
| Comparative Example 5 | 40/60 | 89 | 20 | 20 | 33 |
| Comparative Example 6 | 40/60 | 90 | 20 | 20 | 40 |

*1 means non-pearl pigment

Using the semi-transmissive semi-reflective film laminates 25 obtained in Examples 29–47 and Comparative Examples 11–13 a liquid crystal panel 212 consisting of the structure shown in FIG. 8 was obtained. Next, in conformity with the method described in JIS C 7072 1988 for measuring the contrast ratio (CR) of a liquid crystal display panel, an evaluation of the image contrast of the obtained liquid crystal panel 212 was performed.

The positional relationship between light source 1, liquid crystal panel 2 or 212 and photometer 104 in the evaluation of image contrast using transmitted light is shown in FIG. 11. In this case, the space between light source 1 and liquid crystal panel 2 or 212 is, for example, 1 cm, and the space between liquid crystal panel 2 or 212 and photometer 104 is set to 50 cm.

Moreover, the positional relationship between light source 1, liquid crystal panel 2 or 212 and photometer 104 using reflected light is shown in FIG. 12. In this case, the space between light source 1 and liquid crystal panel 2 or 212, and the space between liquid crystal panel 2 or 212 and photometer 104 are set to 50 cm. In particular, in the measurement using reflected light, the angle between light source 1, liquid crystal panel 2 or 212, and photometer 104 is set to be 45°.

A 5 W EL was used when the light source was transmitted light, and a 40 W fluorescent light was used when the light source was reflected light. The model of photometer employed was an LS-100 photometer manufactured by Minolta Camera. The results of the measurements are shown in Tables 3, 4 and 5.

In the following Tables 3, 4 and 5, the symbol "*" indicates a CR of 4 or greater, "o" a CR in the range of 3 to

TABLE 2

| | viscosity of semi-transmissive semi-reflective layer coating solution (cps) | transmittanace of light rays of protective layer (%) | transmittance CR | reflectance CR |
|---|---|---|---|---|
| Example 1 | 2000 | — | * | * |
| Example 2 | 1500 | — | * | * |
| Example 3 | 2000 | — | O | * |
| Example 4 | 1900 | — | O | O |
| Example 5 | 2000 | — | * | O |
| Example 6 | 3000 | — | * | * |
| Example 7 | 2800 | — | * | * |
| Example 8 | 2500 | — | * | O |
| Example 9 | 2500 | — | O | * |
| Example 10 | 2000 | 94 | * | * |
| Example 11 | 2000 | — | * | * |
| Comparative Example 1 | 1800 | — | * | XX |
| Comparative Example 2 | 2000 | — | O | XX |
| Comparative Example 3 | 1800 | — | * | XX |
| Comparative Example 4 | 1800 | — | * | XX |
| Comparative Example 5 | 1800 | — | * | XX |
| Comparative Example 6 | 80 | — | * | XX |

TABLE 3

| | semi-transmissive semi-reflective layer | | | pearl pigment | | | |
| --- | --- | --- | --- | --- | --- | --- | --- |
| | P/B ratio | transmittance of light rays of light transmissive resin (%) | thickness (μm) | average particle diameter (μm) | angle of orientation (°) | trans- mittance CR | reflec- tance CR |
| Example 12 | 20/80 | 83 | 20 | 10 | 5 | * | * |
| Example 13 | 20/80 | 83 | 20 | 10 | 4 | * | * |
| Example 14 | 20/80 | 83 | 20 | 10 | 5 | * | * |
| Example 15 | 35/65 | 83 | 20 | 35 | 12 | * | * |
| Example 16 | 20/80 | 89 | 20 | 6 | 3 | * | * |
| Example 17 | 20/80 | 75 | 20 | 10 | 6 | * | * |
| Example 18 | 6/94 | 83 | 100 | 10 | 24 | * | * |
| Example 19 | 35/65 | 83 | 0.5 | 35 | 10 | * | ○ |
| Example 20 | 20/80 | 83 | 20 | 200 | 21 | ○ | * |
| Example 21 | 20/80 | 83 | 20 | 0.8 | 5 | * | ○ |
| Example 22 | 20/80 | 83 | 20 | 220 | 15 | X | * |
| Example 23 | 20/80 | 83 | 110 | 10 | 22 | ○ | ○ |
| Example 24 | 20/80 | 83 | 0.2 | 10 | 1 | * | ○ |
| Example 25 | 20/80 | 83 | 20 | 1 | 5 | * | * |
| Example 26 | 50/50 | 83 | 20 | 10 | 5 | ○ | * |
| Example 27 | 60/40 | 83 | 20 | 10 | 7 | X | * |
| Example 28 | 3/97 | 85 | 20 | 10 | 4 | * | X |

TABLE 4

| | semi-transmissive semi-reflective layer | | | protective layer | pearl pigment | | | |
| --- | --- | --- | --- | --- | --- | --- | --- | --- |
| | P/B ratio | transmittance of light rays of light transmissive resin (%) | thickness (μm) | transmittance of simple light rays of light (%) | average particle diameter (μm) | angle of orientation (°) | trans- mittance CR | reflec- tance CR |
| Example 29 | 40/60 | 89 | 20 | 91 | 20 | 5 | * | * |
| Example 30 | 30/70 | 89 | 20 | 91 | 20 | 4 | * | * |
| Example 31 | 40/60 | 89 | 100 | 91 | 20 | 21 | ○ | * |
| Example 32 | 40/60 | 89 | 20 | 91 | 200 | 11 | ○ | ○ |
| Example 33 | 40/60 | 89 | 10 | 91 | 20 | 5 | * | ○ |
| Example 34 | 40/60 | 89 | 20 | 91 | 2 | 3 | * | * |
| Example 35 | 60/40 | 89 | 20 | 91 | 20 | 7 | * | * |
| Example 36 | 5/95 | 89 | 20 | 91 | 20 | 4 | * | ○ |
| Example 37 | 40/60 | 89 | 20 | 40 | 20 | 5 | ○ | * |
| Example 38 | 40/60 | 89 | 20 | 55 | 20 | 5 | ○ | * |
| Example 39 | 35/65 | 83 | 0.5 | 94 | 35 | 2 | * | ○ |
| Example 40 | 35/65 | 83 | 0.5 | 85 | 35 | 1 | ○ | * |
| Example 41 | 40/60 | 89 | 20 | 91 | 10 | 4 | * | * |
| Example 42 | 40/60 | 89 | 20 | 91 | 100 | 15 | * | * |
| Example 43 | 20/80 | 89 | 20 | 91 | 20 | 4 | * | * |
| Example 44 | 45/55 | 89 | 20 | 91 | 20 | 5 | * | * |
| Example 45 | 40/60 | 89 | 10 | 91 | 20 | 5 | * | * |
| Example 46 | 40/60 | 89 | 45 | 91 | 20 | 7 | * | * |
| Example 47 | 40/60 | 91 | 20 | 91 | 20 | 7 | * | * |

TABLE 5

| | semi-transmissive semi-reflective layer | | | protective layer | pearl pigment | | trans-mittance CR | reflec-tance CR |
|---|---|---|---|---|---|---|---|---|
| | P/B ratio | transmittance of light rays of light transmissive resin (%) | thickness (μm) | transmittance of simple light rays of light (%) | average particle diameter (μm) | angle of orientation (°) | | |
| Comparative Example 7 | 35/65 | 83 | 20 | — | 35 | 13 | X | XX |
| Comparative Example 8 | 20/80 | 83 | 20 | — | — | — | * | XX |
| Comparative Example 9 | 20/80 | 83 | 20 | — | — | — | * | XX |
| Comparative Example 10 | 0/100 | 83 | 20 | — | — | — | * | XX |
| Comparative Example 11 | 40/60 | 89 | 20 | 91 | (3)*1 | — | * | XX |
| Comparative Example 12 | 40/60 | 89 | 20 | 91 | (1)*1 | — | O | XX |
| Comparative Example 13 | 0/100 | 89 | 20 | 91 | — | — | * | XX |

*1 means non-pearl pigment.

What is claimed:

1. A production method for the preparation of a semi-transmissive semi-reflective film laminate consisting of a polarizing film and a semi-transmissive semi-reflective layer comprising a light transmissive resin and angled pearl pigments, comprising the step of forming a coated layer containing a solution for said semi-transmissive semi-reflective layer, the average of the angle of orientation of the pearl pigments being set to less than 30° by means of providing shearing stress to the coated layer, said angle of orientation being between the longitudinal axis of the pearl pigments and a line parallel to the planar direction of said polarizing film whereby incident light is reflected with regularity in a fixed direction.

2. A production method for a semi-transmissive semi-reflective film laminate according to claim 1, wherein the space between said pearl pigments is from 0.1–5 μm.

3. A production method for a semi-transmissive semi-reflective film laminate according to claim 1, wherein the number of pearl pigments in the direction of thickness of said semi-transmissive semi-reflective layer is from 2 to 10.

4. A production method for a semi-transmissive semi-reflective film laminate according to claim 1, wherein the thickness of said semi-transmissive semi-reflective layer is from 0.5–100 μm.

5. A production method for a semi-transmissive semi-reflective film laminate according to claim 1, wherein the weight percentage of the solid materials of the pearl pigments and said resin in the semi-transmissive semi-reflective layer is from 5/95 to 50/50.

6. A production method for a semi-transmissive semi-reflective film laminate according to claim 1, wherein the average particle diameter of the pearl pigments is from 1–200 μm.

7. A production method for a semi-transmissive semi-reflective film laminate according to claim 1, wherein the average particle diameter of the pearl pigments is from 10–100 μm.

8. A production method for the preparation of a semi-transmissive semi-reflective film laminate consisting of a polarizing film and a semi-transmissive semi-reflective layer, comprising the steps of:

A1: forming a coated layer by coating and adhering a coating solution for said semi-transmissive semi-reflective layer containing light transmissive resin and angled pearl pigments to a polarizing film;

B1: adjusting the applied layer by bringing the coated layer into contact with a tool for adjusting layer thickness; and C1: drying the applied layer after adjusting its thickness;

wherein the average of the angle of orientation of the pearl pigments is set to be less than 30° by means of providing shearing stress to the coated layer in at least one of steps A1 and B1, said angle of orientation being between the longitudinal axis of the pearl pigments and a line parallel to the planar direction of said polarizing film whereby incident light is reflected with regularity in a fixed direction.

9. A production method for a semi-transmissive semi-reflective film laminate according to claim 8 wherein the viscosity of the coating solution for the semi-transmissive semi-reflective layer is in a range of 100 cps to 500 cps.

10. A production method for a semi-transmissive semi-reflective film laminate according to claim 9 wherein the shear rate between the layer thickness adjusting tool and the coated layer is in a range of $10^2$ sec$^{-1}$ to $10^6$ sec$^{-1}$.

11. A production method for the preparation of a semi-transmissive semi-reflective film laminate consisting of a polarizing film and a semi-transmissive semi-reflective layer, comprising the steps of:

A2: forming a coated layer on a roller by supplying a coating solution for said semi-transmissive semi-reflective layer containing light transmissive resin and angled pearl pigments to a rotating roller;

B2: adjusting the coated layer by bringing the coated layer on the roller into contact with a tool for adjusting layer thickness;

C2: transferring the coated layer after adjusting the thickness of the applied layer to a polarizing film, and coating and adhering it; and D2: drying the coated layer on the polarizing film;

wherein the average of the angle of orientation of the pearl pigments is set to be less than 30° by means of providing shearing stress to the coated layer in at least one step selected from the group consisting of steps A2, B2 and C2, said angle of orientation being between the longitudinal axis of the pearl pigments and a line parallel to the planar direction of said polarizing film whereby incident light is reflected with regularity in a fixed direction.

12. A production method for the preparation of a semi-transmissive semi-reflective film laminate consisting of a polarizing film and a semi-transmissive semi-reflective layer, comprising the steps of:

A3: forming a coated layer by coating and adhering a coating solution for said semi-transmissive semi-reflective layer containing light transmissive resin and angled pearl pigments to a transfer sheet;

B3: adjusting the coated layer by bringing the coated layer into contact with a tool for adjusting layer thickness;

C3: drying the coated layer after adjusting the thickness of the applied layer; and D3: laminating the dried semi-transmissive semi-reflective layer which is on the transfer sheet to the polarizing film;

wherein the average of the angle of orientation of the pearl pigments is set to be less than 30° by means of providing shearing stress to the coated layer in at least one of steps A3 and B3, said angle of orientation being between the longitudinal axis of the pearl pigments and a line parallel to the planar direction of said polarizing film whereby incident light is reflected with regularity in a fixed direction.

13. A production method for a semi-transmissive semi-reflective film laminate according to claim 12 wherein a transparent sheet treated with a releasing agent selected from the group consisting of silicone and fluorine is used as the transfer sheet.

14. A production method for the preparation of a semi-transmissive semi-reflective film laminate consisting of a polarizing film and a semi-transmissive semi-reflective layer, comprising the steps of:

A4: obtaining a coated layer by supplying a coating solution for said semi-transmissive resin and angled pearl pigments to a rotating roller;

B4: adjusting the coated layer by bringing it into contact with a tool for adjusting layer thickness;

C4: transferring the coated layer after adjusting the thickness of the applied layer to a transfer sheet, and coating and adhering it;

D4: forming a semi-transmissive semi-reflective layer by drying the coated layer on the transfer sheet; and E4: laminating the dried semi-transmissive semi-reflective layer on a polarizing film;

wherein the average of the angle of orientation of the pearl pigments is set to be less than 30° by means of providing shearing stress to the coated layer in at least one of steps A4, B4 and C4, said angle of orientation being between the longitudinal axis of the pearl pigments and a line parallel to the planar direction of said polarizing film whereby incident light is reflected with regularity in a fixed direction.

15. A production method for a semi-transmissive semi-reflective film laminate according to claim 14 wherein a transparent sheet treated with a releasing agent selected from the group consisting of silicone and fluorine is used as the transfer sheet.

\* \* \* \* \*